United States Patent [19]

Hara et al.

[11] Patent Number: 4,980,543

[45] Date of Patent: Dec. 25, 1990

[54] MULTIPLE DENOMINATOR BANK NOTE DEPOSITOR/DISPENSER WITH AUTOMATIC LOADING TO AND FROM STORAGE SECTION

[75] Inventors: Junichiro Hara, Tokyo; Hazime Harada, Yokohama, both of Japan

[73] Assignee: Tokyo Shibaura Denki Kabushiki Kaisha, Kawasaki, Japan

[21] Appl. No.: 574,241

[22] Filed: Jan. 26, 1984

[30] Foreign Application Priority Data

Jan. 26, 1983 [JP] Japan ................................. 58-11180
Feb. 7, 1983 [JP] Japan ................................. 58-16617

[51] Int. Cl.[5] ..................... G06M 3/02; G06K 13/00; G06F 15/30

[52] U.S. Cl. ..................................... 235/379; 209/534

[58] Field of Search ............... 209/534; 194/DIG. 26; 235/379, 380, 381, 382, 385; 364/408

[56] References Cited

U.S. PATENT DOCUMENTS

| | | | |
|---|---|---|---|
| 2,792,148 | 5/1957 | Goldenberg | 235/381 |
| 3,211,268 | 10/1965 | Dills et al. | 194/4 B |
| 3,445,633 | 5/1969 | Ratner | 235/381 |
| 3,447,655 | 6/1969 | Tanaka et al. | 194/4 R |
| 3,644,713 | 2/1972 | Hayakawa et al. | 235/381 |
| 3,648,020 | 3/1972 | Tateisi et al. | 364/406 |
| 3,731,799 | 5/1973 | Meloni et al. | 209/534 |
| 3,760,158 | 9/1973 | Whitehead et al. | 221/9 |
| 3,765,523 | 10/1973 | Nakanishi | 271/180 |
| 3,783,989 | 1/1974 | Jensen | 194/4 G |
| 3,800,155 | 3/1974 | Potenza | 250/557 |
| 3,826,344 | 7/1974 | Wahlberg | 194/2 |
| 3,862,716 | 1/1975 | Black et al. | 235/381 |
| 3,888,267 | 6/1975 | Gautschi | 133/3 R |
| 3,917,260 | 11/1975 | Okkonen et al. | 271/181 |
| 3,934,693 | 1/1976 | Ooyama | 194/4 R |
| 3,937,925 | 2/1976 | Boothroyd | 235/381 |
| 3,943,335 | 3/1976 | Kinker et al. | 235/379 |
| 3,966,947 | 6/1976 | Steiner | 514/357 |
| 3,988,571 | 10/1976 | Blair et al. | 235/379 |
| 4,011,931 | 3/1977 | Wyckoff | 194/4 C |
| 4,017,004 | 4/1977 | Onoe et al. | 221/94 |
| 4,020,972 | 5/1977 | Lundblad | 221/13 |
| 4,023,011 | 5/1977 | Nakajima et al. | 235/478 |
| 4,096,991 | 6/1978 | Iguchi | 235/455 |
| 4,109,238 | 8/1978 | Creekman | 340/825.33 |
| 4,159,782 | 7/1979 | Swartzendruber | 235/379 |
| 4,199,100 | 4/1980 | Wostl et al. | 222/2 |
| 4,253,016 | 2/1981 | Hirose | 235/381 |
| 4,266,121 | 5/1981 | Hirose | 235/381 |
| 4,280,036 | 7/1981 | Fukatsu | 235/379 |
| 4,282,424 | 8/1981 | Hirose | 235/379 |
| 4,283,708 | 8/1981 | Lee | 382/7 |
| 4,320,854 | 3/1982 | Hirose | 221/12 |
| 4,355,711 | 10/1982 | Hirose | 194/4 C |
| 4,363,584 | 12/1982 | Kokubo | 414/33 |
| 4,365,700 | 12/1982 | Arimoto et al. | 194/2 |
| 4,398,088 | 8/1983 | Hirose et al. | 235/379 |
| 4,434,359 | 2/1984 | Watanabe | 235/379 |
| 4,463,939 | 8/1984 | Watanabe | 235/381 X |
| 4,473,157 | 9/1984 | Hirose et al. | 209/534 |
| 4,479,049 | 10/1984 | Hirose | 235/379 |
| 4,510,380 | 4/1985 | Uchida et al. | 235/379 |

FOREIGN PATENT DOCUMENTS

| | | | |
|---|---|---|---|
| 024704 | 3/1981 | European Pat. Off. . | |
| 54-11339 | 9/1979 | Japan | 209/534 |
| 0033758 | 4/1981 | Japan . | |
| 2025106 | 12/1960 | United Kingdom | 209/534 |
| 1047055 | 11/1966 | United Kingdom | 271/181 |
| 1300848 | 12/1972 | United Kingdom . | |
| 1370972 | 10/1974 | United Kingdom . | |
| 1481425 | 7/1977 | United Kingdom . | |
| 1518995 | 7/1978 | United Kingdom . | |
| 2094531 | 9/1982 | United Kingdom | 209/534 |

*Primary Examiner*—Clark A. Jablon

*Attorney, Agent, or Firm*—Cushman, Darby & Cushman

[57] ABSTRACT

In an automatic bank note transaction apparatus bills dispensed from a first storage section for storing bills to be loaded are discriminated when the number of bills (to be loaded) of the given denomination is specified, bills are loaded into a second storage section in units of denominations in accordance with the discrimination result, the number of bills is counted in units of denominations in accordance with the discrimination result, and bill transfer from the first storage section to the second storage section is stopped when the count of each denomination coincides with the specified number of bills. Furthermore, the number of bills transferred from the first storage section for storing the bills to be loaded to the second storage section for storing the bills to be dispensed to the customer is counted, and the loading content is displayed or printed in accordance with the count result.

20 Claims, 3 Drawing Sheets

JD

JC

MULTIPLE DENOMINATOR BANK NOTE DEPOSITOR/DISPENSER WITH AUTOMATIC LOADING TO AND FROM STORAGE SECTION

BACKGROUND OF THE INVENTION

The present invention relates to an automatic bank note transaction apparatus and, more particularly, to an automatic bank note transaction apparatus installed in an automated corner of a bank branch and receiving/-dispensing bank notes or bills.

Recently, various types of depositing/dispensing apparatus have been efficiently used as automatic bank note (banking) transaction apparatuses in practice. These automatic banking transaction apparatuses have been known as automatic teller machines (ATMs) which are installed in automated corners of bank branches. These ATMs allow customers to automatically withdraw and deposit cash (bills). The ATM can continue to serve even outside banking hours. Therefore, ATMs can be installed in department stores and supermarkets, and the number of ATMs being installed is increasing and will continue to do so.

Widespread application of the ATM is accompanied by important effects on issues such as the effective utilization of bills or capital in the depositing/dispensing apparatus, a decrease in labor, and banking systems. In order to achieve the effective utilization of capital, an ATM has been developed and has been available wherein bills received by the ATM are subsequently used as bills to be dispensed thereby.

In the depositing/dispensing apparatus of this type, every morning bank personnel load bills of predetermined denominations which they consider will be required that day. The bills are manually loaded into the bill compartments of the apparatus. Alternatively, bills of each denomination are manually inserted in units of 100 bills into corresponding compartments through a loading port of the depositing/dispensing apparatus.

In the former loading method, the loading operation becomes cumbersome. In the latter method, the number of loaded bills cannot be known; the number of bills loaded through the loading port cannot be identified with the number of bills stored in each predetermined bill compartment.

SUMMARY OF THE INVENTION

The present invention has been made in consideration of the above situation, and has for its object to provide an automatic bank note transaction apparatus wherein a desired number of bills of each denomination can be loaded so that bank personnel can easily know how many bills are loaded in a given bill compartment, thereby improving operability.

In order to achieve the above object of the present invention, in an automatic bank note transaction apparatus according to the present invention, bills dispensed from a first storage section for storing bills to be loaded are discriminated when the number of bills (to be loaded) of the given denomination is specified, bills are loaded into a second storage section in units of denominations in accordance with the discrimination result, the number of bills is counted in units of denominations in accordance with the discrimination result, and bill transfer from the first storage section to the second storage section is stopped when the count of each denomination coincides with the specified number of bills.

Furthermore, the number of bills transferred from the first storage section for storing the bills to be loaded to the second storage section for storing the bills to be dispensed to the customer is counted, and the loading content is displayed or printed in accordance with the count result.

According to one aspect of the present invention, there is provided an automatic bank note transaction apparatus which comprises first storing means for storing loading bank notes; second storing means for storing transaction bank notes; conveying means for conveying the loading bank notes from said first storing means to said second storing means, said conveying means having a convey path for connecting said first storing means to said second storing means and conveying the bank notes; discriminating means, provided in said convey path, for discriminating the bank notes passing therethrough and generating a discrimination result; counting means for counting the number of bank notes passing through said discriminating means in accordance with the discrimination result and generating a count result; and output means for generating a loading content in accordance with the count result.

BRIEF DESCRIPTION OF THE DRAWINGS

The drawings illustrate an automatic bank note (banking) transaction apparatus according to one embodiment of the present invention, in which.

DETAILED DESCRIPTION OF THE PREFERRED EMBODIMENT

An automatic bank note (banking) transaction apparatus according to an embodiment of the present invention will be described with reference to the accompanying drawings.

Figure 1:
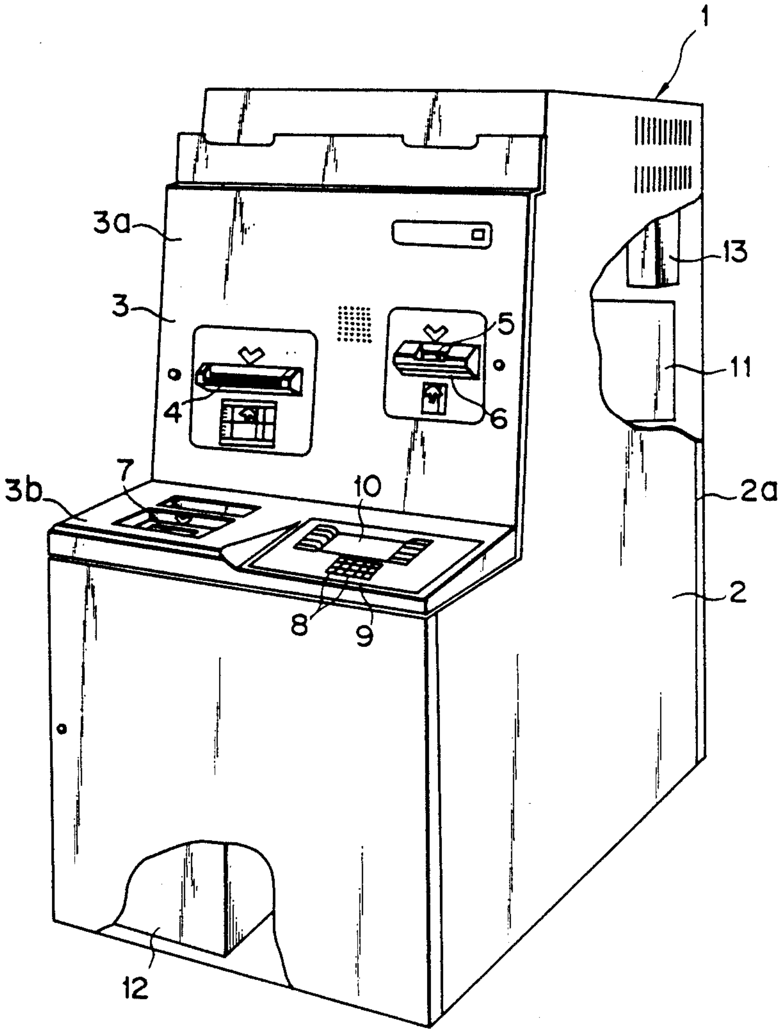
FIG. 1 is a partially cutaway perspective view of the apparatus.

FIG. 1 shows a depositing/dispensing apparatus 1 of an automatic bill circulating system as the automatic bank note transaction apparatus. The apparatus 1 has a main body 2, and an operation panel 3 is provided at the customer side of the main body 2. A passbook insertion port 4, a card insertion port 5 and a receipt dispensing port 6 are formed in a vertical panel portion 3*a* of the operation panel 3. A bill receiving/dispensing port (bill port) 7 which serves as both a bill inlet port and a bill outlet port, an operation section 9 having a plurality of operation buttons 8, and an instruction display section (i.e., CRT display unit) 10 are provided in a horizontal panel portion 3*b* of the operation panel 3.

A passbook reader/printer (not shown in FIG. 1) and a card/receipt processing unit 11 are arranged in the main body 2. The passbook reader/printer reads magnetic information on a passbook received through the passbook insertion port 4, records the read magnetic information, and prints a transaction content on the passbook. The card/receipt processing unit 11 deals with a magnetic card inserted through the card insertion port 5, produces a receipt and dispenses it through the receipt dispensing port 6, and prepares a journal duplicate. The main body 2 also contains a bill receiving/dispensing mechanism 12 for dispensing received bills, and recovering dispensed bills which are accidentally left at the bill receiving/dispensing port 7, and an internal monitor unit 13 for loading the bills and discriminating them.

The construction of the bill receiving/dispensing mechanism 12 will be described with reference to FIGS. 2A and 2B.

Figure 2A:
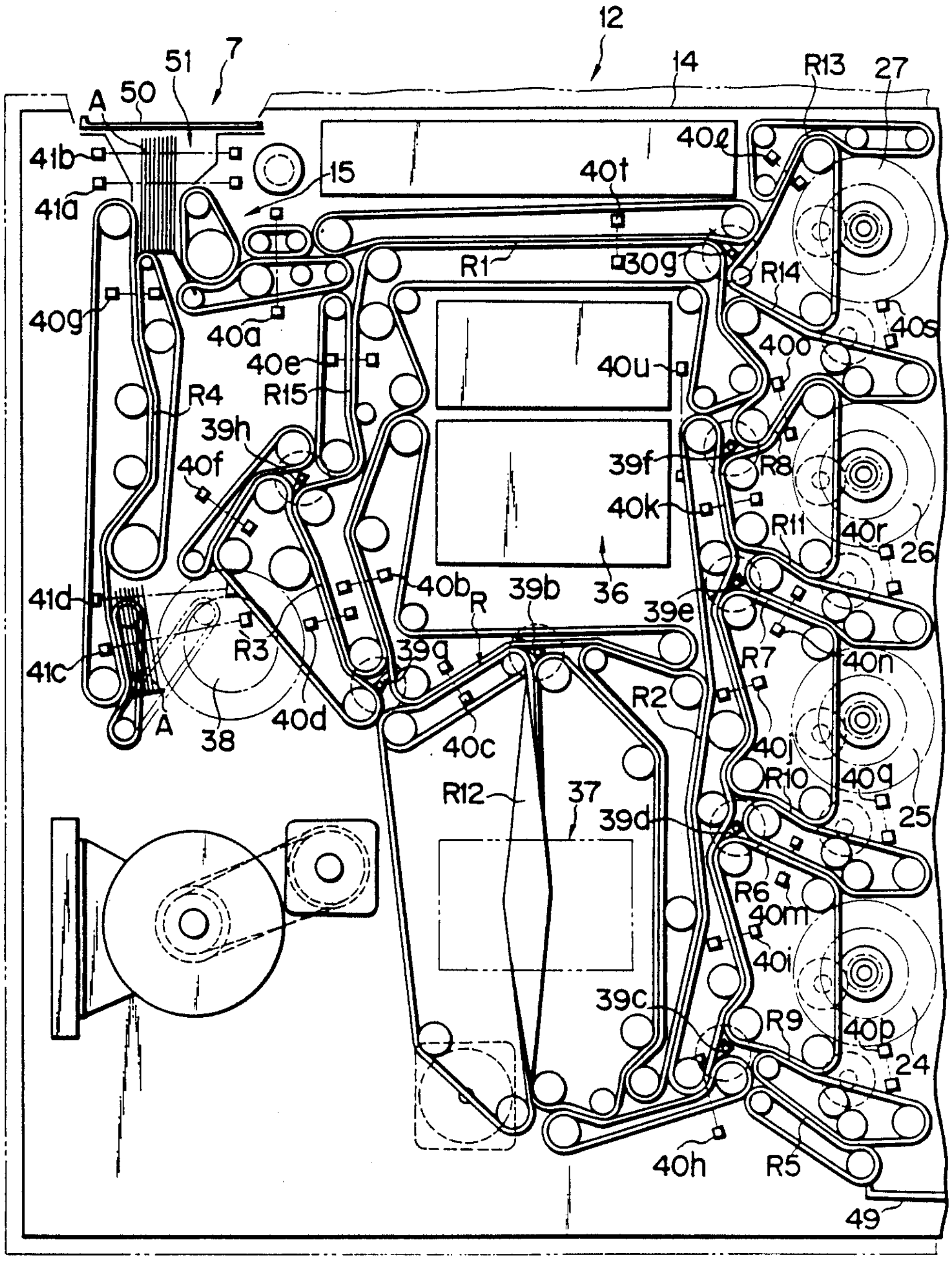
FIGS. 2A and 2B are longitudinal sectional views schematically showing left and right portions of a bill receiving/dispensing mechanism of the apparatus, respectively.
Figure 2B:
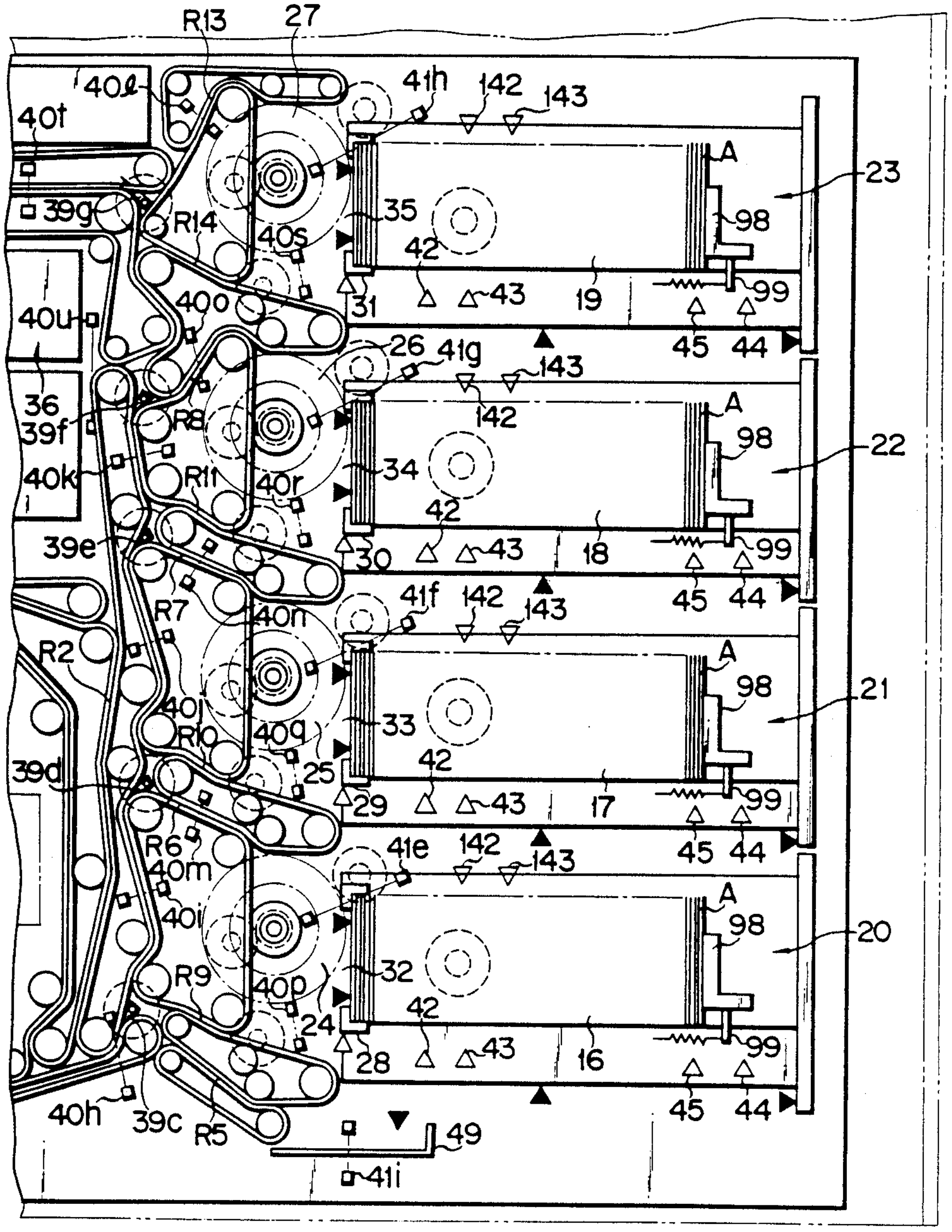

Referring to FIGS. 2A and 2B, reference numeral 14 denotes a housing of the bill receiving/dispensing mechanism 12. A bill receiving/dispensing unit 15 is disposed in the upper portion of the front side (customer side) of the housing 14 so as to oppose the bill receiving/dispensing port 7. First, second, third and fourth bill cassettes 16, 17, 18 and 19 are vertically disposed from the bottom to the top of the rear side (bank side) of the housing 14. The first to fourth bill cassettes 16 to 19 constitute a first storage section 20 as an improper bill storage section for storing bills of a first denomination (i.e., $50, £10 or DM50) which are unfit for dispensation and rejected bills, a second storage section 21 for storing bills of a second denomination (i.e., $10, £5 or DM10), a third storage section 22 for storing bills of a third denomination (i.e., $100, £20 or DM100), and a fourth storage section (recovery compartment/loading compartment) 23 for storing recovered and loading bills, respectively. Each of the first to fourth bill cassettes 16 to 19 can be pulled out from the main body 2 by opening a rear door 2*a* disposed at the rear side (bank side) of the main body 2 of the depositing/dispensing apparatus 1.

First, second, third and fourth bill stacking/dispensing units 24, 25, 26 and 27 are vertically disposed at substantially the center along the front-to-rear direction (horizontal direction in the drawings) of the housing 14 so as to respectively correspond to outlet ports of the bill storage sections 20, 21, 22 and 23. Separator mechanisms 28, 29, 30 and 31 as partitioning means for distinguishing the present transaction from the previous transaction are disposed in the bill storage sections 20, 21, 22 and 23, respectively. Temporary storage sections 32, 33, 34 and 35 are formed between the mechanism 28 and the unit 24, between the mechanism 29 and the unit 25, between the mechanism 30 and the unit 26, and between the mechanism 31 and the unit 27, respectively.

A discrimination section 36 is disposed in the front portion of the housing 14 substantially centrally along the vertical direction thereof. A reverse-presented bill inverting section 37 is disposed below the discrimination section 36, and a temporary stacking section 38 is disposed in front of the discrimination section 36.

Bill convey paths R are formed in the housing 14 so as to convey bills A to the corresponding sections. More particularly, the convey paths R consist of: a first convey path R1 for conveying the bill A from the bill receiving/dispensing unit 15 through the discrimination section 36 to a first branch disposed between the discrimination section 36 and the temporary stacking section 38; a second convey path R2 for conveying the bill A from the first branch to a merge portion of the first convey path R1 which is located at the inlet port of the discrimination section 36; a third convey path R3 for conveying the bill A from the first branch to the temporary stacking section 38; a fourth convey path R4 for conveying the bill A from the temporary stacking section 38 to the bill receiving/dispensing unit 15; a fifth convey path R5 for conveying the bill A from a second branch which is defined at an intermediate portion of the second convey path R2 and located in front of and below the first stacking/dispensing unit 24 to a rejected bill stacking section 49 disposed under the first storage section 20; a sixth convey path R6 for conveying the bill A from a third branch which is defined at an intermediate portion of the second convey path R2 and located in front of and above the first stacking/dispensing unit 24 to the first stacking/dispensing unit 24; a seventh convey path R7 for conveying the bill A from a fourth branch which is defined at an intermediate portion of the second convey path R2 and located in front of and above the second stacking/dispensing unit 25 to the second stacking/dispensing unit 25; an eighth convey path R8 for conveying the bill A from a fifth branch which is defined at an intermediate portion of the second convey path R2 and located in front of and above the third stacking/dispensing unit 26 to the third stacking/dispensing unit 26; a ninth convey path R9 for conveying the bill A from the first stacking/dispensing unit 24 to a merge portion of the second convey path R2 located in front of the first stacking/dispensing unit 24;

a tenth convey path R10 for conveying the bill A from the second stacking/dispensing unit 25 to a merge portion of the second convey path R2 located in front of the second stacking/dispensing unit 25; an eleventh path R11 for conveying the bill A from the third stacking/dispensing unit 26 to a merge portion of the second convey path R2 located in front of the third stacking/-dispensing unit 26; a twelfth convey path R12 for conveying the bill A from a sixth branch which is defined at an intermediate portion of the second convey path R2 and is located below the discrimination section 36 to a merge portion which is defined at an intermediate portion of the second convey path R2 and which is located in front of the second branch so as to invert the bill by 180 degrees; a thirteenth convey path R13 for conveying the bill A from a seventh branch which is defined at an intermediate portion of the first convey path R1 and located in front of the fourth stacking/dispensing unit 27 to the fourth stacking/dispensing unit 27; a fourteenth convey path R14 for conveying the bill A from the fourth stacking/dispensing unit 27 to a merge portion which is defined at an intermediate portion of the second convey path R2 and which is located in front of and below the fourth stacking/dispensing unit 27; and a fifteenth convey path R15 for conveying the bill A from an eighth branch defined at an intermediate portion of the third convey path R3 to a merge portion defined at an intermediate portion of the first convey path R1.

First to eighth selector gates 39*a*, 39*c*, 39*d*, 39*e*, 39*f*, 39*b*, 39*g* and 39*h* are disposed at the first to eighth branches, respectively. Each selector gate guides the bill A which has reached the corresponding branch to one of the two corresponding convey paths. The selector gates 39*a* to 30*h* are driven by rotary solenoids (not shown), respectively. Bill flow sensors 40*a* to 40*u* are arranged at respective predetermined positions of the convey paths R. Bill presence/absence sensors (residual bill sensors) 41*a* to 41*i* are disposed at respective stacking locations of the bills A. Each of the sensors 40*a* to 40*u* and 41*a* to 41*i* comprises a known pair of a light-emitting element and a light-receiving element.

A full-state sensor 44, a near-full-state sensor 45, an empty-state sensor 42 and a near-empty-state sensor 43 are arranged in each of the bill storage sections 20, 21, 22 and 23. Each of these sensors 42, 43, 44 and 45 comprises a microswitch which is turned on/off by a slider 99 fixed to a push plate 98 (to be described later).

The bill receiving/dispensing unit 15 which is disposed to oppose the bill receiving/dispensing port 7 will now be described with reference to FIGS. 3 to 6.

The bill receiving/dispensing unit 15 has a bill take-in mechanism 15*a* and a bill take-out mechanism 15*b*. Reference numeral 50 denotes a door for opening/closing the bill receiving/dispensing port 7. A handle 50*a* of the door 50 is at a lower level than the horizontal panel portion 3*b*, so that the opening/closing operation of the door 50 is not impeded by a customer's belongings such as a handbag.

A bill storage chamber 51 is formed below the bill receiving/dispensing port 7 which is opened/closed by the door 50. The bottom wall of the bill storage chamber 51 is defined by a guide plate 52, and side walls thereof are respectively defined by opposing surfaces of a first conveyor belt 53 of the bill take-in mechanism 15*a* and a second conveyor belt 54 of the bill take-out mechanism 15*b*.

The bill take-in mechanism 15*a* has the following construction. The first conveyor belt 53 is looped between pulleys 55 and 56 which are vertically disposed in the housing 14. A reception roller 57 is coaxial with the lower pulley 55. The roller 57 has a diameter slightly larger than that of the pulley 55 so that the circumferential surface of the roller 57 extends slightly beyond the outer surface of the first conveyor belt 53 looped around the pulley 55. The lower end of the roller 57 is in contact with a reverse brake belt 58 which serves as an overlying bill reception preventing means.

A backup member 59 is arranged with the second conveyor belt 54 in a nest configuration so as to be horizontally movable. The backup member 59 is mounted to a horizontally extending guide shaft 61 through a linear bearing 60. The backup member 59 can be moved by a backup member actuator (not shown) through the guide shaft 61 between a position where the backup member 59 urges the bills A in the bill storage chamber 51 against the first conveyor belt 53 and a position where the backup member 59 is situated to the left of the second convey or belt 54 so that bills A are removed from the bill storage chamber 51.

The bill take-out mechanism 15*b* has the following construction. A pulley (not shown) is disposed to oppose the roller 57 and a third conveyor belt 62 is looped around the pulley. This pulley is integrally mounted with a pulley 63. A pulley 64 is disposed above the pulley 63. The second conveyor belt 54 is looped around the pulleys 63 and 64. The opposing surfaces of the third conveyor belt 62 and a fourth conveyor belt 66 looped around a pulley 65 disposed at the bottom of the bill storage chamber 51 define the fourth convey path R4 of the convey paths R, which conveys the bills A from the temporary stacking section 38 to the bill storage chamber 51.

The pulley 64 is mounted at the free end of an arm 71. The proximal end of the arm 71 is supported to freely swing about a pivot pin 68. The arm 71 is normally biased by a spring 69 to be separated from the bill storage chamber 51, and abuts against a stopper 70.

The arm 71 is pivoted by an arm actuator 72 about the pivot pin 68 against the biasing force of the spring 69, so that the arm 71 is inserted into the bill storage chamber 51. A spring 75 is provided such that one end thereof is connected to a plunger 73*a* of a solenoid 73, an intermediate portion thereof is wound around a guide pulley 74, and the other end thereof is connected to the proximal end of the arm 71. The biasing force of the spring 75 is stronger than that of the spring 69. When the solenoid 73 having the construction described above is energized, the plunger 73*a* is withdrawn to pivot the arm 71 clockwise against the biasing force of the spring 69, so that the arm 71 is inserted into the bill storage chamber 51.

The bills taken-in, one by one, upon rotation of the roller 57 are guided by a guide plate 76 and are fed between conveyor belts 77 and 78 which constitute part of the first convey path R1 of the convey paths R. The driven roller having the conveyor belt 77 looped therearound is pivotally mounted on a shaft on which the reverse brake belt 58 is also mounted.

The residual bill sensors 41*a* and 41*b* are vertically arranged in the bill storage chamber 51 to be spaced apart from each other so as to detect the presence/absence of bills A. The upper sensor 41*b* is positioned such that a space is defined between the upper end of the largest bill A and the optical axis of the sensor 41*b* when the largest bill A is completely stored in the bill storage chamber 51. In this state, the light-receiving element of the upper sensor **41*b* receives light from the light-emitting element and generates a "bright" signal. The lower sensor 41*a* is positioned such that a space is defined between the lower end of the bill A and the optical axis of the sensor 41*a* when a bill which is being dispensed or returned is partially dispensed so as to extend from the bill receiving/dispensing port 7. The light-receiving element of the lower sensor 41*a*** receives light from the light-emitting element and generates a "bright" signal.

Bill reception at the time of cash deposit will now be described with reference to FIGS. 3 and 4.

Figure 3:
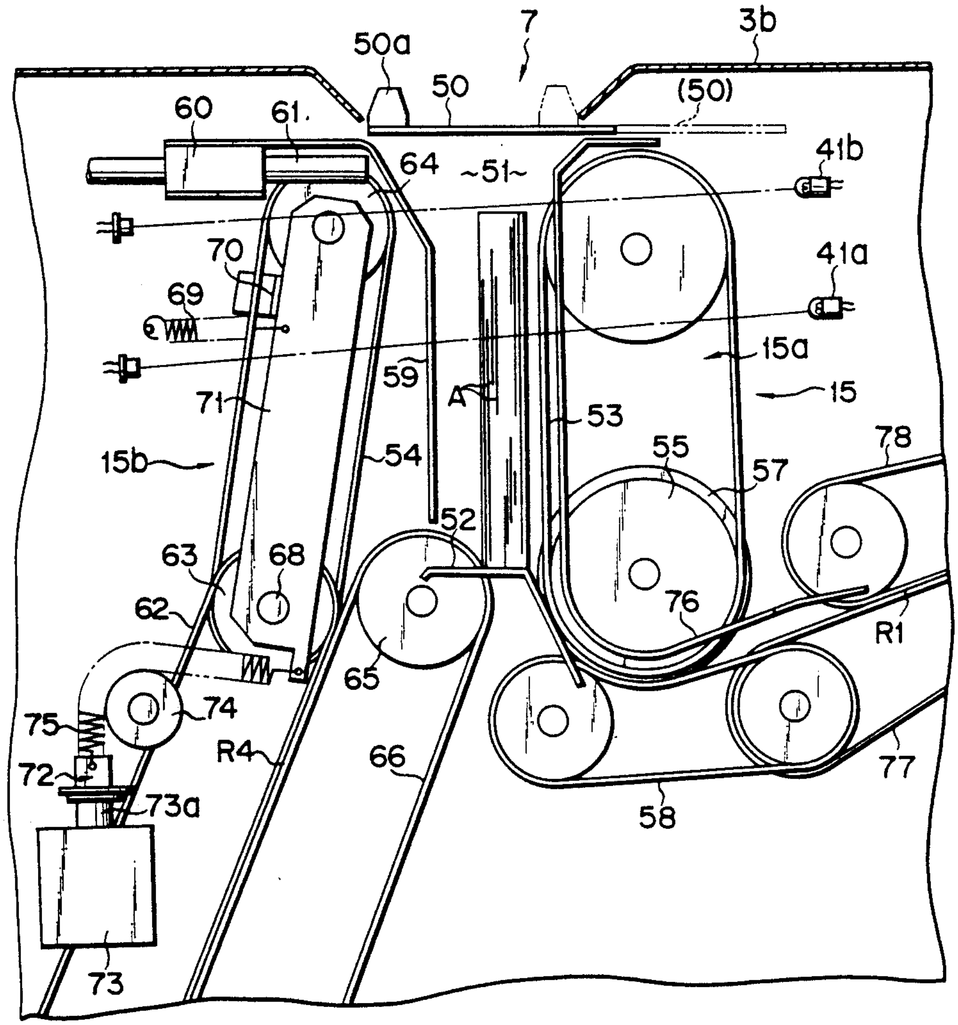
FIGS. 3 to 6 are respectively side views showing the different operating states of a bill receiving/dispensing unit of the bill receiving/dispensing mechanism of the apparatus.

When a customer operates the apparatus to deposit cash, the door 50 is pulled by a motor (not shown) to the right in the drawings to open the bill reception/dispensing port 7, as indicated by the alternate long and two dashed line in FIG. 3. In this case, since the backup member 59 is located in the position where it is separated from the bill storage chamber 51,. the customer can vertically insert a bundle of obverse-and/or reverse-presented bills of various denominations through the bill receiving/dispensing port 7 into the bill storage chamber 51. When the customer has finished inserting the bills, he moves the door 50 by means of the handle **50*a* to the left, so that the bill receiving/dispensing port 7 is closed. When the door 50** is closed, a sensor (not shown) detects the closed state, and the bill convey operation is started.

Figure 4:
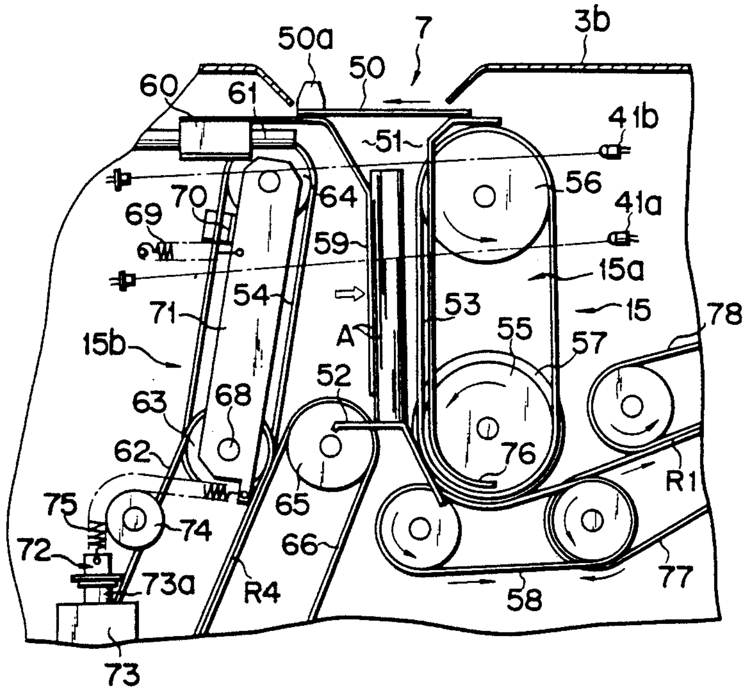

As shown in FIG. 4, the first conveyor belt 53 starts to move counterclockwise in the direction given by the arrow. Upon movement of the conveyor belt 53, the roller 57 having a rubber member of a high friction coefficient on its outer surface is rotated. At the same time, the backup member 59 is moved by the backup actuator (not shown) to the right. Therefore, as shown in FIG. 4, the bills A are urged to the right and are pressed against the roller 57 and the first conveyor belt 53. In this case, the backup member 59 urges the bills A through a spring (not shown). Therefore, the bills can be properly pressed irrespective of the thickness of the bundle of bills, so that the backup actuator will not be overloaded.

The bill A contacting the roller 57 is conveyed upon rotation of the roller 57. In this case, the second and subsequent bills A will not be conveyed, due to the action of the reverse brake belt 58 which rotates in the direction opposite to the convey direction. The bills A are thus fed, one by one, into the first convey path R1 defined between the conveyor belts 77 and 78.

Figure 5:
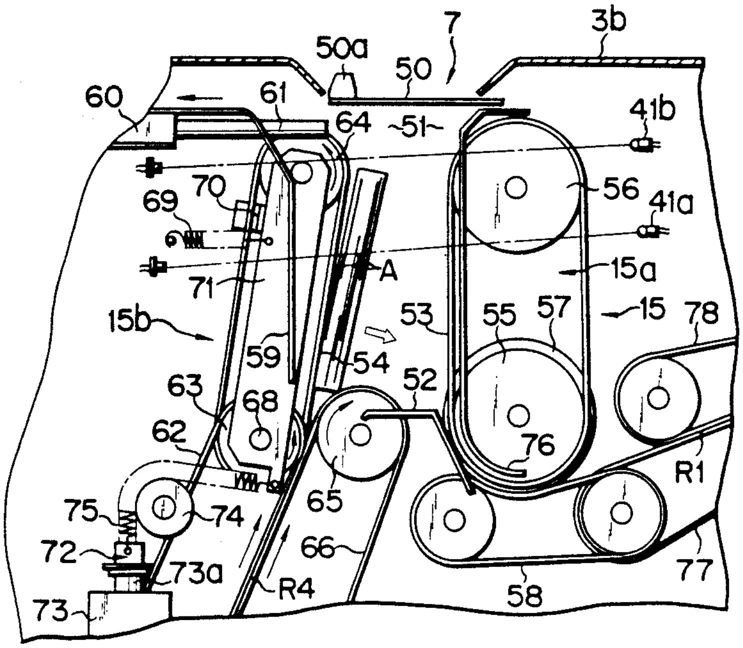

An operation will be described with reference to FIG. 5 wherein the bills A which are being returned to the bill receiving/dispensing port 7 are conveyed to the bill storage chamber 51. In this case, first, the bill receiving/dispensing port 7 is closed by the door 50. The backup member 59 is moved to the left and is separated from the bill storage chamber 51. The leading end of a bundle of bills A fed through the fourth convey path R4 defined between the conveyor belts 62 and 66 can be fed into the bill storage chamber 51 defined between the opposing surface of the second conveyor belt 54 and the first conveyor belt 53.

When the feeding of the bundle of bills A into the bill storage chamber 51 is completed, these bills which require a re-reading operation, such as rejected bills received at the time of cash deposit, are subjected to convey operation (FIG. 4) while the door 50 is closed.

Figure 6:
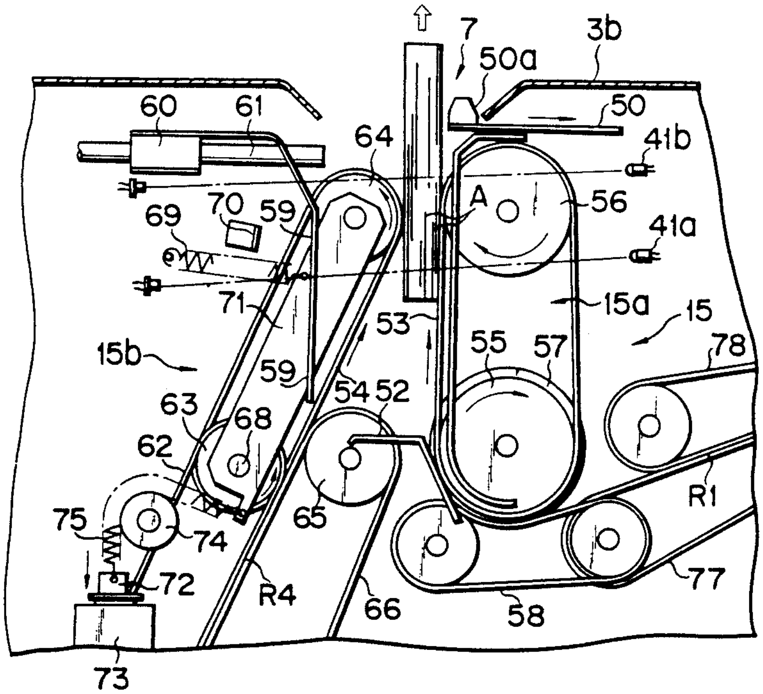

On the other hand, when re-reading is not required as in the case of automatic return of the bills at the time of cash deposit or in the case of bill dispensing, the following operation is performed As shown in FIG. 6, the backup member 59 is held in the left position. Then, the solenoid 73 is energized while the feeding of the bills A is temporarily stopped. The arm 71 provided with the pulley 64 driven by the second conveyor belt 54 is pivoted clockwise about the pivot shaft 68. The bills A in the bill storage chamber 51 are thus clamped between the first conveyor belt 53 and the second conveyor belt 54.

Thereafter, the door 50 is moved by a motor (not shown) to open the bill receiving/dispensing port 7. The second conveyor belt 54 at the left side is driven at a low speed of 1/10 the normal fed speed counterclockwise in the direction indicated by the arrow. At the same time, the first conveyor belt 53 at the right side is driven at the same low speed and is driven clockwise in the direction given by the arrow. Therefore, the bills A are fed upward. When the lower residual bill sensor **41*a* generates a "bright" signal, the conveyor belts 53 and 54** are stopped.

In this case, the bills A are stopped such that more than half of their length extends from the receiving/dispensing port 7. The customer can easily remove the bills A from the port 7.

Furthermore, since the bills are firmly clamped by the biasing force of the spring 75, they will neither fall out nor be blown away by a gust of wind.

When the customer removes the bills A, the upper sensor **41*b* generates the "bright" signal, and the bill receiving/dispensing port 7 is automatically closed by the door 50. Meanwhile, when the door 50 is closed, the solenoid 73 is deenergized, and the arm 71 returns to the initial position as shown in FIG. 4. The backup member 59 which has been held at the left position is returned to the position shown in FIG. 3**. The next step is then initiated.

When the residual bill sensor **41*b* does not generate a "bright" signal after a predetermined time interval has elapsed, the machine detects that the customer has forgotten to remove the dispensed bills, and the recovery operation is started. The first and second conveyor belts 53 and 54 are driven at a low speed of 1/10 the normal speed in the direction opposite to the dispensing direction, while the bills A remain clamped between the first and second conveyor belts 53 and 54. The reverse movement of the conveyor belts 53 and 54 continues until the residual bill sensor 41*b* generates the "bright" signal. The generation of the "bright" signal indicates that the bills A are completely withdrawn into the bill storage chamber 51. Therefore, the solenoid 73 is deenergized, and the arm 71 having the pulley 64 driven by the second conveyor belt 54 returns to the initial position. At the same time, the bill receiving/dispensing port 7 is closed by the door 50**.

Thereafter, the normal reception operation is performed as described with reference to FIG. 4. The forgotten bills are recovered, one by one.

The temporary stacking section 38 will be described with reference to FIG. 7.

The temporary stacking section 38 has a stacking mechanism **38*a* and a dispensing mechanism 38*b*. Reference numeral 80 denotes a temporary stacking chamber. The bottom portion of the temporary stacking chamber 80 is defined by a guide plate 81, and side walls thereof are respectively defined by the opposing surfaces of a conveyor belt 82 of the stacking mechanism 38*a* and an extended portion 62*a* of the third conveyor belt 62 in the dispensing mechanism 38*b*. The third convey path R3 is defined by opposing surfaces of a conveyor belt 84 looped around a pulley 83 disposed above the temporary stacking chamber 80 and another pulley (not shown), and a conveyor belt 85. The bill A selected by the selector gate 39*h* (FIG. 2A) disposed in the eighth branch is guided to the temporary stacking chamber 80** through the third convey path R3.

An impeller 86 is disposed below the end of the third convey path R3. The leading end of a single conveyed bill A clamped between the conveyor belts 84 and 85 is inserted between adjacent blades **86*a* of the impeller 86, which rotates counterclockwise. The leading end of the bill A is guided downward by the conveyor belt 84 until it abuts against the conveyor belt 82. At this moment, the trailing end (upper end) of the bill A remains clamped between the blade 86*a* of the impeller 86 and the conveyor belt 84. Thereafter, the bill A is conveyed downward along the belt 82 and when the trailing end of the bill A is released from being clamped between the conveyor belt 84 and the blade 86*a*, the bill A flies to the left due to the action of the next blade 86*a*. Therefore, the bill A is stacked in the temporary stacking chamber 80 at a sufficient distance from the conveyor belt 82. The next bill A is inserted between the stacked bill A and the conveyor belt 82, and this bill is stacked in the temporary stacking chamber 80** in the same manner as described above.

The conveyor belt 82 which serves as a guide for removing the bill A from the impeller 86 is looped around a pulley 87 located in the vicinity of a main shaft **86*b* of the impeller 86 and a pulley 88 located below the guide plate 81. The upper pulley 87 is mounted on the free end portion of an arm 92 supported to swing about a shaft 89 of the lower pulley 88. The arm 92 normally abuts against a stopper 91 by the biasing force of a spring 90 and is biased to lie outside the temporary stacking chamber 80 as indicated by solid line in FIG. 7. The arm 92 is pivoted by an arm actuator (not shown) (in the same manner as the arm actuator 72 (FIGS. 3 to 6) of the bill receiving/dispensing unit 15) counterclockwise against the biasing force of the spring 90. Therefore, as indicated by the alternate long and two short dashed line in FIG. 7, the bills A in the temporary stacking chamber 80 are urged against the extended portion 62*a* of the conveyor belt 62**.

The conveyor belt 82 is driven at the same speed as that of the conveyor belt 62 through a drive system (not shown). The bills A in the temporary stacking chamber 80 are fed into the fourth convey path R4 of the convey paths R as one bundle.

The presence/absence of the bills A within the temporary stacking chamber 80 is detected by a "dark"/"bright" signal from the residual bill sensor **41*c***.

The reverse-presented bill inverting section 37 has a known construction wherein the conveyor belts are twisted by 180 degrees to invert the bill while the bill is conveyed clamped between the conveyor belts, and a detailed description thereof will be omitted.

The first to fourth stacking/dispensing units 24 to 27 and the separator mechanisms 28 to 31 as partitioning means will now be described with reference to FIGS. 8 to 11. Each of the stacking/dispensing units has the same construction, and each of the separator mechanisms has the same construction, so that only the first stacking/dispensing unit 24 and the first separator mechanism 28 will be exemplified, and a description of other stacking/dispensing units and other separator mechanisms will be omitted.

Reference numeral 100 denotes a pair of stacking impellers. The impellers 100 are mounted on a common shaft 103, which is rotatably supported through a pair of bearings 102 (FIG. 10) respectively mounted on frames 101. The shaft 103 is rotated clockwise through a power transmission system 105 having a pulse motor 104 as a drive source.

A pair of rotating members 106 as dispensing mechanisms are disposed on the outer sides of the impellers 100 such that the peripheral portions of the rotating members 106 partially overlay the peripheral portions of the impellers 100, respectively. Each rotating member 106 is rotatably mounted on a hollow shaft 107 horizontally provided to be parallel to the shaft 103 on which the impellers 100 are mounted. Furthermore, each rotating member 106 is driven in either the forward or reverse direction through a drive system (not shown).

Figure 9:
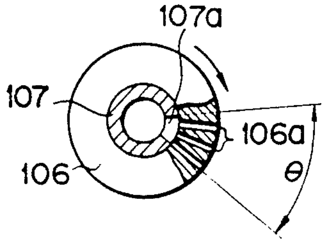
FIG. 9 is a partial sectional view of a rotating roller of the apparatus.

Part of the outer surface of each of the rotating members 106 is made of a material such as rubber having a high friction coefficient, as shown in FIG. 9. A plurality of suction holes **106*a* are formed in the outer surface of the rotating member 106 within a predetermined angular range $\theta$ (45 degrees in this embodiment). A through hole 107*a* which communicates with a vacuum source (not shown) is formed in the hollow shaft 107. The suction holes 106*a* oppose the through hole 107*a* at a given timing to attract a bill which is brought into contact with the suction holes 106*a***.

Figure 10:
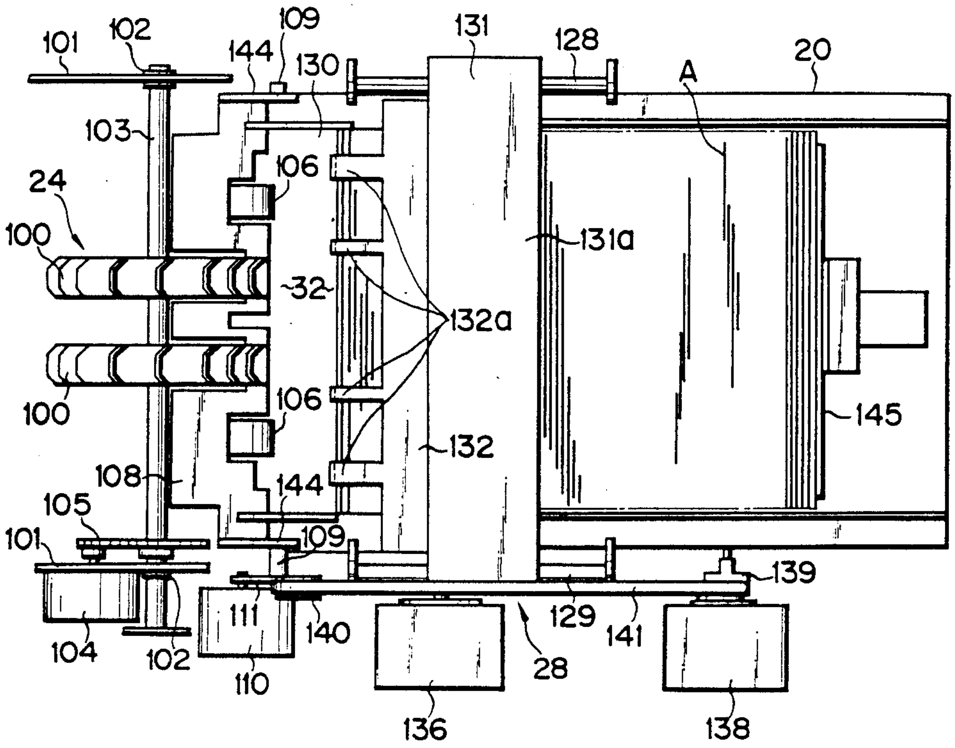
FIGS. 10 and 11 are respectively a plan view and a side view schematically showing a separator mechanism and a stacking/dispensing unit.

A movable member 108 is disposed in a nest configuration with the rotating members 106 and the impellers 100. The movable member 108 is movably mounted on a shaft 109, as shown in FIG. 10. The shaft 109 is coupled to a power transmission system 111 having a pulse motor 110 as a drive source, and is driven in either the forward or reverse direction through the power transmission system 111 by the pulse motor 110. In this manner, the movable member 108 swings between the stacking position indicated by the solid line and the dispensing position indicated by the alternate long and short dashed line in FIG. 11. When stacking is performed using the impellers 100, the movable member 108 is held in the stacking position, so that one part of the moving member 108 crosses the impellers 100 to serve as a guide portion **108*a* for removing the bills A from the impellers 100. The other part of the moving member 108 serves as a stopper 108*b* for closing an outlet port 112 of the first storage section 20. When each bill A is dispensed by the rotating members 106, the moving member 108 is pivoted by a predetermined angle and is shifted from the stacking position to the dispensing position, so that the guide 108*a* supports the bill A by urging it from a direction (transverse direction) perpendicular to the dispensing direction (downward direction). Therefore, the stopper 108*b* is removed from the outlet port 112**.

Figure 8:
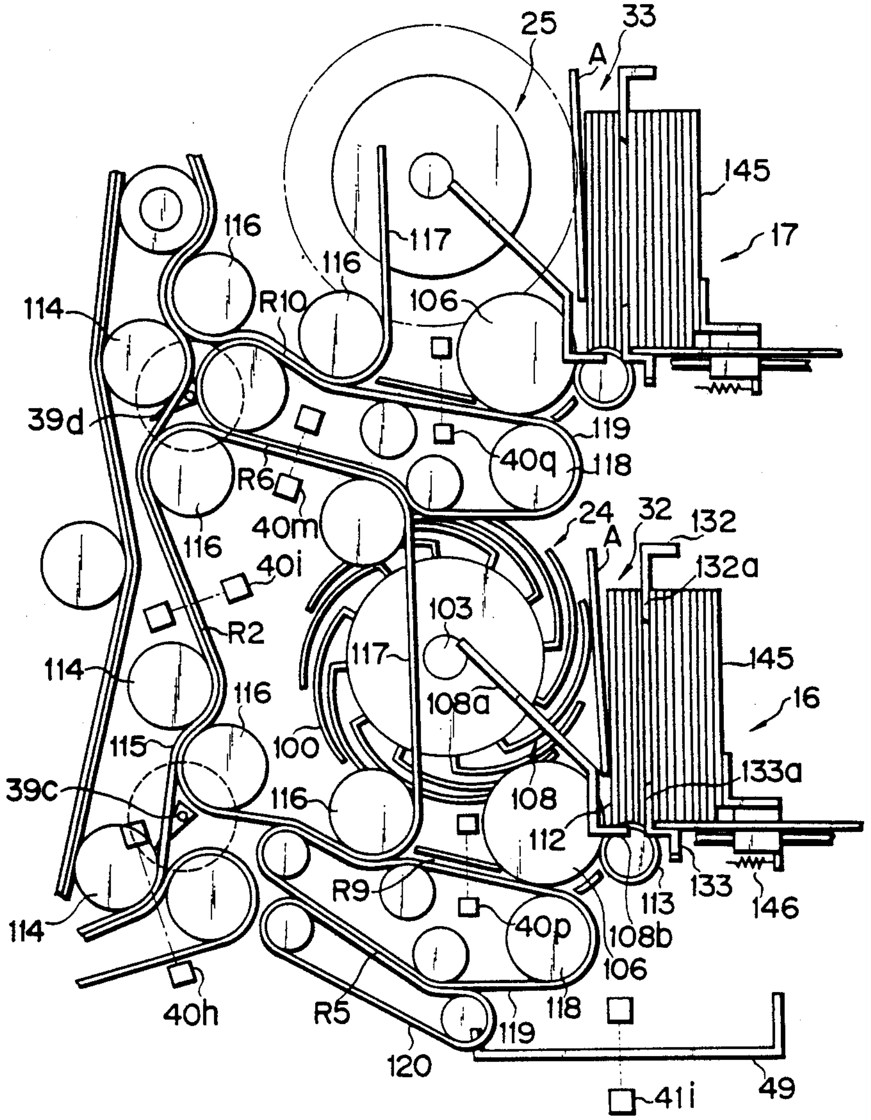
FIG. 8 is a side view of a stacking/dispensing unit of the apparatus.

An overlying bill reception preventing roller 113 (as shown in FIG. 8) is disposed at the outlet port 112 to separate the second and subsequent bills from the first bill A to be attracted.

As shown in FIG. 8, the trailing end of the sixth convey path branched from the second convey path R2 of the convey paths R opposes an upper portion of the impellers 100. The bill A passed through the selector gate **39*d* is guided to the impellers 100 through the sixth convey path R6. The ninth convey path R9 whose trailing end merges with the second convey path R2 is formed below the impellers 100. The bill A dispensed through the rotating members 106** as the dispensing mechanism is conveyed to the second convey path R2 through the ninth convey path R9.

The second convey path R2 is constituted by the opposing surfaces of a conveyor belt 115 looped around a plurality of guide rollers 114 and four conveyor belts 117 looped around guide rollers 116 such that part of each conveyor belt 117 is in contact with the conveyor belt 115. The sixth convey path R6 is constituted by the opposing surfaces of the conveyor belts 117 and a conveyor belt 119 looped around guide rollers 118 such that part of the conveyor belt 119 is in contact with the upper surface of the conveyor belts 117. The lowest, fifth convey path R5 is constituted by the opposing surfaces of another conveyor belt 119 and a conveyor belt 120 looped such that part of the conveyor belt 120 is in contact with the lower surface of the conveyor belt 119.

The construction of the separator mechanisms 28, 29, 30 and 31 as the partitioning means will be described with reference to FIGS. 10 and 11. The separator mechanisms 28 to 31 have the same construction. Supports 130 are provided in the first, second, third, and fourth storage sections 20, 21, 22 and 23, respectively. A movable rectangular frame 131 is provided on the corresponding support 130 to surround the stacked bills A thereon. The frame 131 is supported by guide rods 128 and 129 so as to reciprocate along the stacking direction of the bills A through a linear bearing (not shown). Flappers 132 and 133 having a plurality of pawls 132*a* and a plurality of pawls 133*a* are disposed on upper and lower frame portions 131*a* and 131*b*, respectively, of the frame 131 to be pivoted about pivot shafts 134 and 135, respectively.

The flappers 132 and 133 receive power from a pulse motor 136 through a link mechanism 137. The pawls 132*a* and 133*a* can be inserted into and removed from the stacking area of the bills A.

Figure 11:
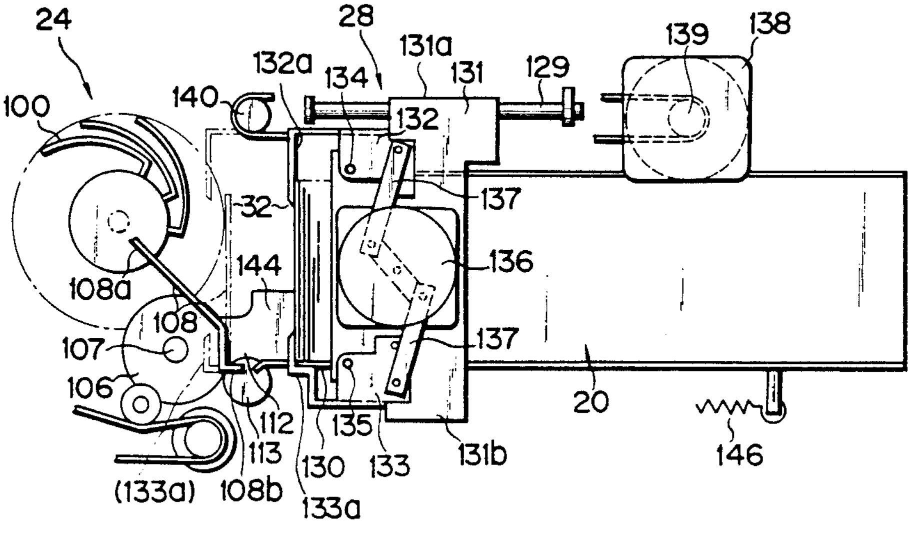

As shown in FIG. 11, a driving pulley 139 attached to the drive shaft of a VR pulse motor 138 is mounted in the vicinity of one end of the guide rod 129, and a driven pulley 140 is mounted in the vicinity of the other end of the guide rod 129. An intermediate portion of a timing belt 141 looped around the pulleys 139 and 140 is coupled to the frame 131. In normal operation, an initial position sensor 142 and a forward position sensor 143 are arranged to hold the frame 131 in the normal stop position, as shown in FIG. 2B. The frame 131 is stopped at the position corresponding to the sensors 142 and 143.

The pawls 132*a* and 133*a* of the flappers 132 and 133 are arranged not to abut against the stacking/dispensing units 24, 25, 26 and 27 even if the frame 131 is moved in the forward direction to the forward position.

Reference numeral 144 denote aligning guide plates which define the two side walls of the temporary storage section 32, which are disposed to be movable by means of driving means (not shown), and which align the bills A along the longitudinal direction.

Figure 12:
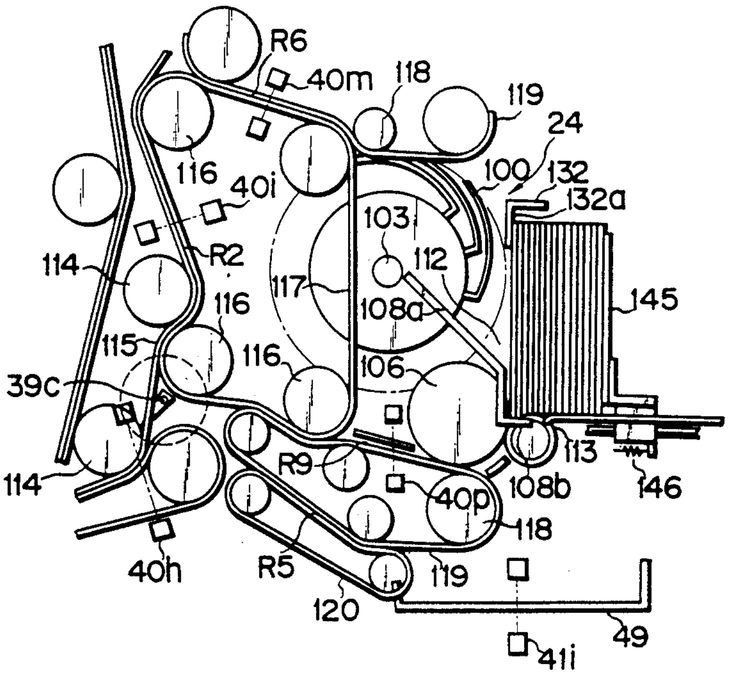
FIGS. 12 to 15 are respectively side views showing the different operating states of the stacking/dispensing unit.
Figure 13:
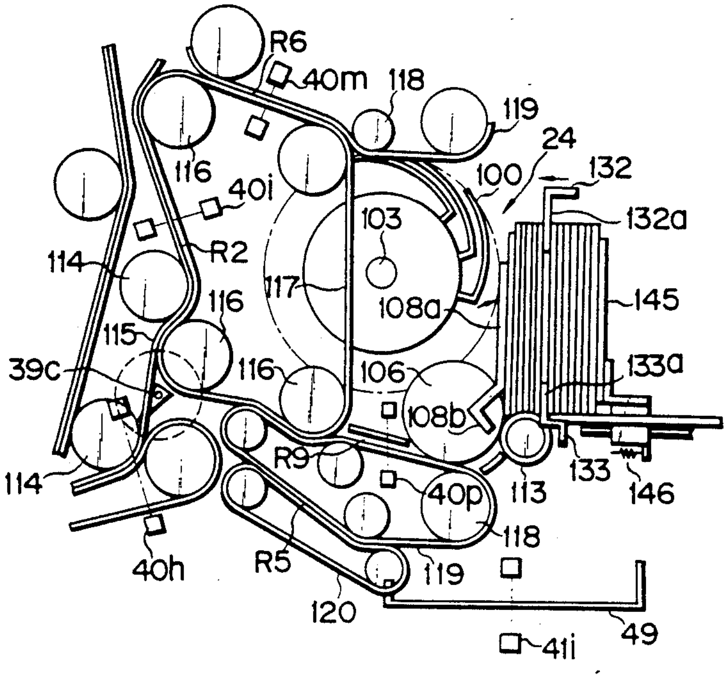
Figure 14:
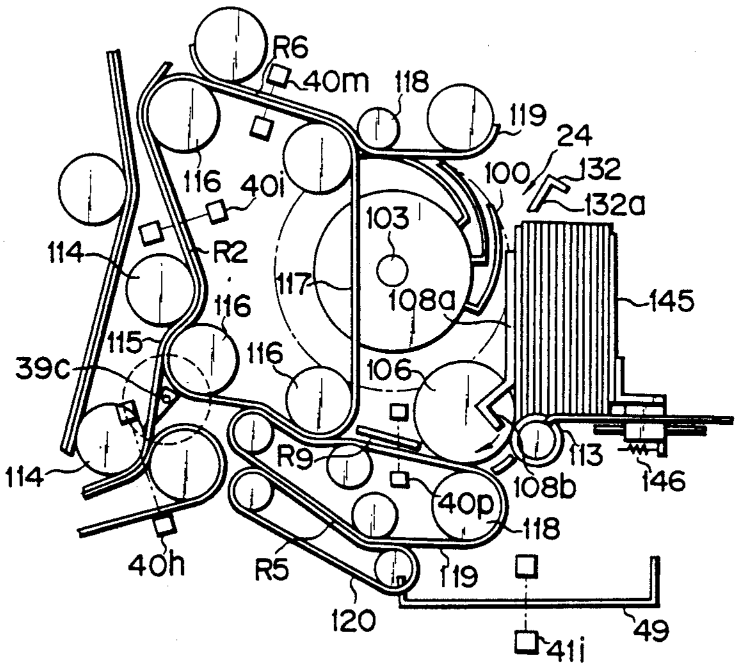
Figure 15:
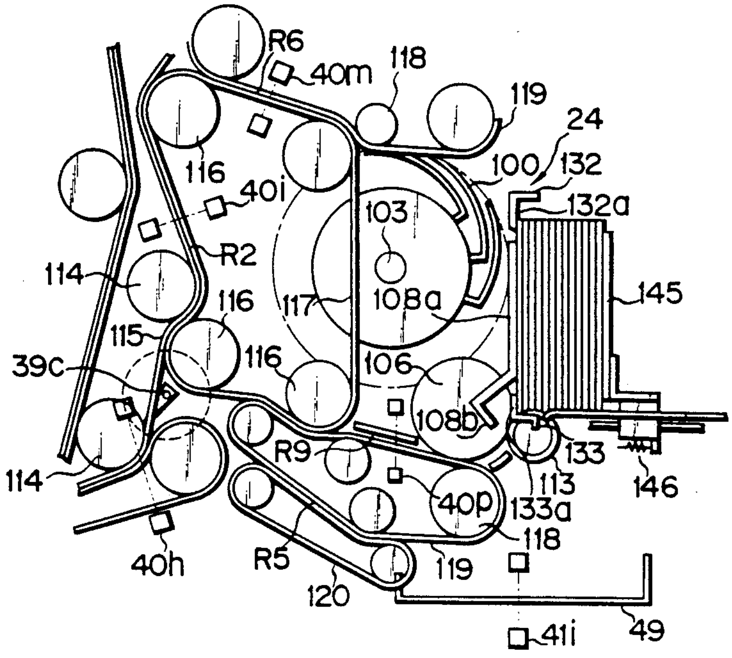

FIG. 8 shows the stacking state of the temporary storage section 32 of the bills. FIG. 12 shows the state of the stacking/dispensing unit 24 and the separator mechanism 28 where cash deposit is performed; FIG. 13 shows the state thereof where the received bills are returned; FIG. 14 shows the state thereof where the bills are dispensed; and FIG. 15 shows the standby state after the bills are dispensed. More particularly, when the bills are stacked in the temporary storage section 32, the movable member 108 is pivoted to the left, as shown in FIG. 8. The guide 108*a* is nested with the impellers 100, and the stopper 108*b* closes the outlet port 112. The pawls 132*a* and 133*a* of the flappers 132 and 133 of the separator mechanism 28 are engaged with the leading ends of the first bill stored in the storage section 20.

When the bills stacked in the temporary storage section 32 are received in the bill storage section 20, the state shown in FIG. 8 changes to the state shown in FIG. 12 wherein the pawls 132*a* and 133*a* are pivoted outside to disengage with the bill. In this manner, the bills A stacked in the temporary storage section 32 are stacked on the bills stored in the bill storage section 20. Thereafter, the pawls 132*a* and 133*a* are moved in the forward direction and are brought into engagement with the forward bill.

When a transaction is not completed or the customer does not confirm his deposit, the state shown in FIG. 8 changes to the state shown in FIG. 13. The pawls 132*a* and 133*a* are held in the positions where the bill is engaged therewith. The movable member 108 is pivoted to the right, and the guide 108*a* abuts against the forward bill of the bills stacked in the temporary storage section 32. Simultaneously, the stopper 108*b* is separated from the outlet port 112 to open it. Thereafter, upon rotation of the rotating member 106, the received bills stacked in the temporary storage section 32 are taken out one by one. It should be noted that the bills stacked in the storage section 20 are separated by the pawls 132*a* and 133*a* from the received bills and will not be dispensed by the rotating members 106.

When the bills are dispensed, the state shown in FIG. 12 changes to the state shown in FIG. 14. The pawls 132*a* and 133*a* are pivoted from the position where the bill is engaged to the position where the bill is not engaged. At the same time, the movable member 108 is pivoted to the right. Thereafter, upon rotation of the rotating member 106, the bills stored in the storage section 20 are dispensed one by one. When the dispensing operation of a predetermined number of bills is completed, the state shown in FIG. 14 changes to the state shown in FIG. 15. The pawls 132*a* and 133*a* are held in the standby mode wherein they engage with the first bill. The stacking/dispensing unit 24 and the separator mechanism 28 are set in this standby mode when the depositing/dispensing apparatus 1 is not operated.

Figure 16:
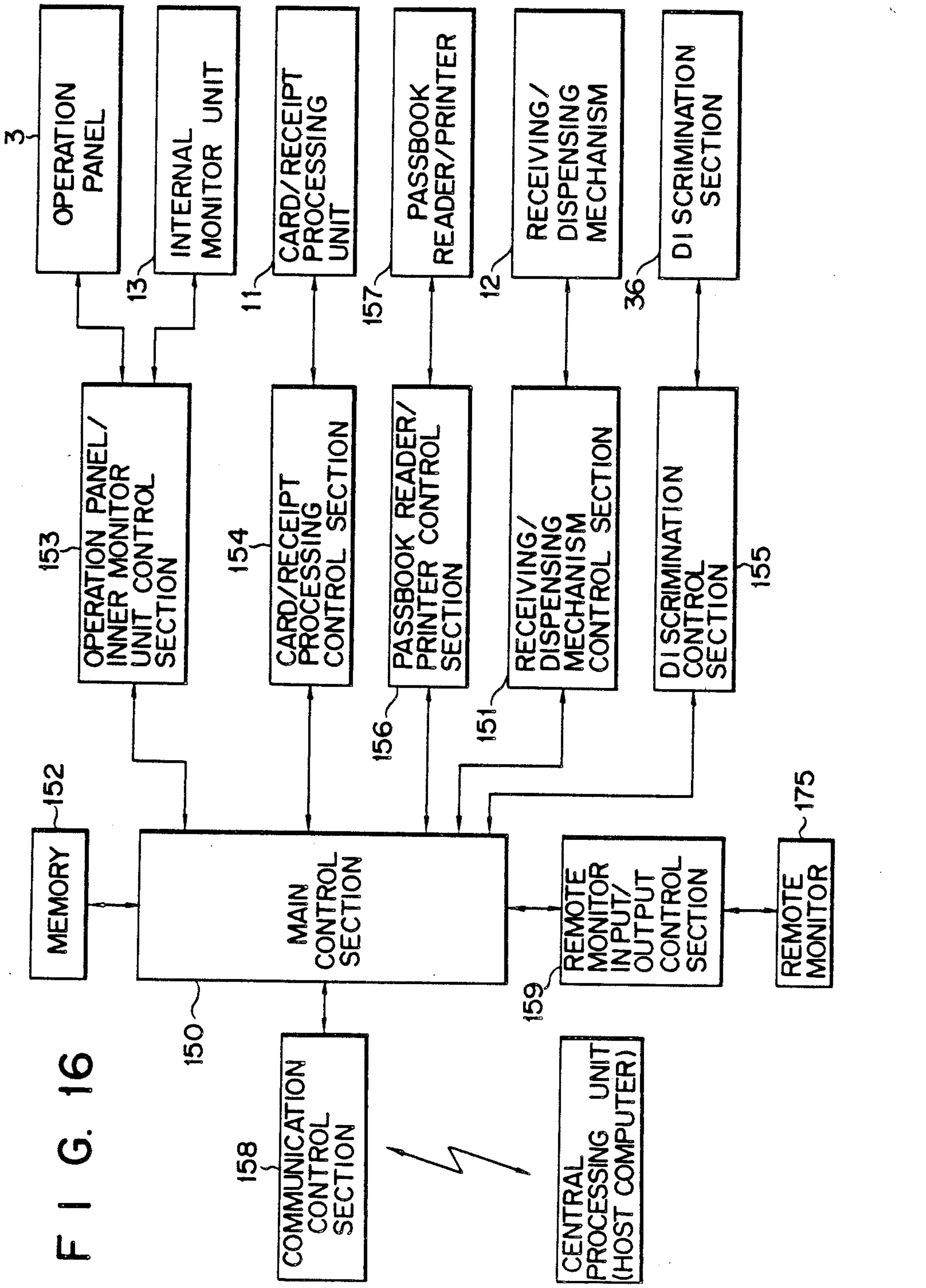
FIG. 16 is a schematic block diagram of a control system of the apparatus.

FIG. 16 is a block diagram for explaining the operation of the depositing/dispensing apparatus 1. A main control section 150 controls the overall operation of the apparatus 1. A memory 152 such as a ROM (read-only memory) stores a control program or the like. A receiving/dispensing mechanism control section 151 controls the receiving/dispensing mechanism 12 in accordance with the signal from the main control section 150 and the signal from a discrimination control section 155. The discrimination control section 155 controls the discrimination section 36. An operation panel/internal monitor unit control section 153 controls the operation panel 3 and the internal monitor unit 13. A card/receipt processing control section 154 controls the card/receipt processing unit 11. A passbook reader/printer control section 156 controls a passbook reader/printer 157 for reading magnetic stripe information of the passbook inserted through the passbook insertion port 4 and printing the transaction contents on the passbook and a journal.

More specifically, the main control section 150 counts the number of bills stored into the storage sections 21, 22 and 23, the number of stored bills, the number of loaded bills, and the total number of bills in units of denominations, in accordance with the signals from the sensors in the receiving/dispensing mechanism 12 and the discrimination signal from the discrimination section 36. The main control section 150 controls through a remote monitor input/output control section 159 a remote monitor 175 disposed to be spaced apart from the depositing/dispensing apparatus 1. Furthermore, the main control section 150 exchanges data with a central processing unit serving as a host computer via a communication control section 158.

Figure 17:
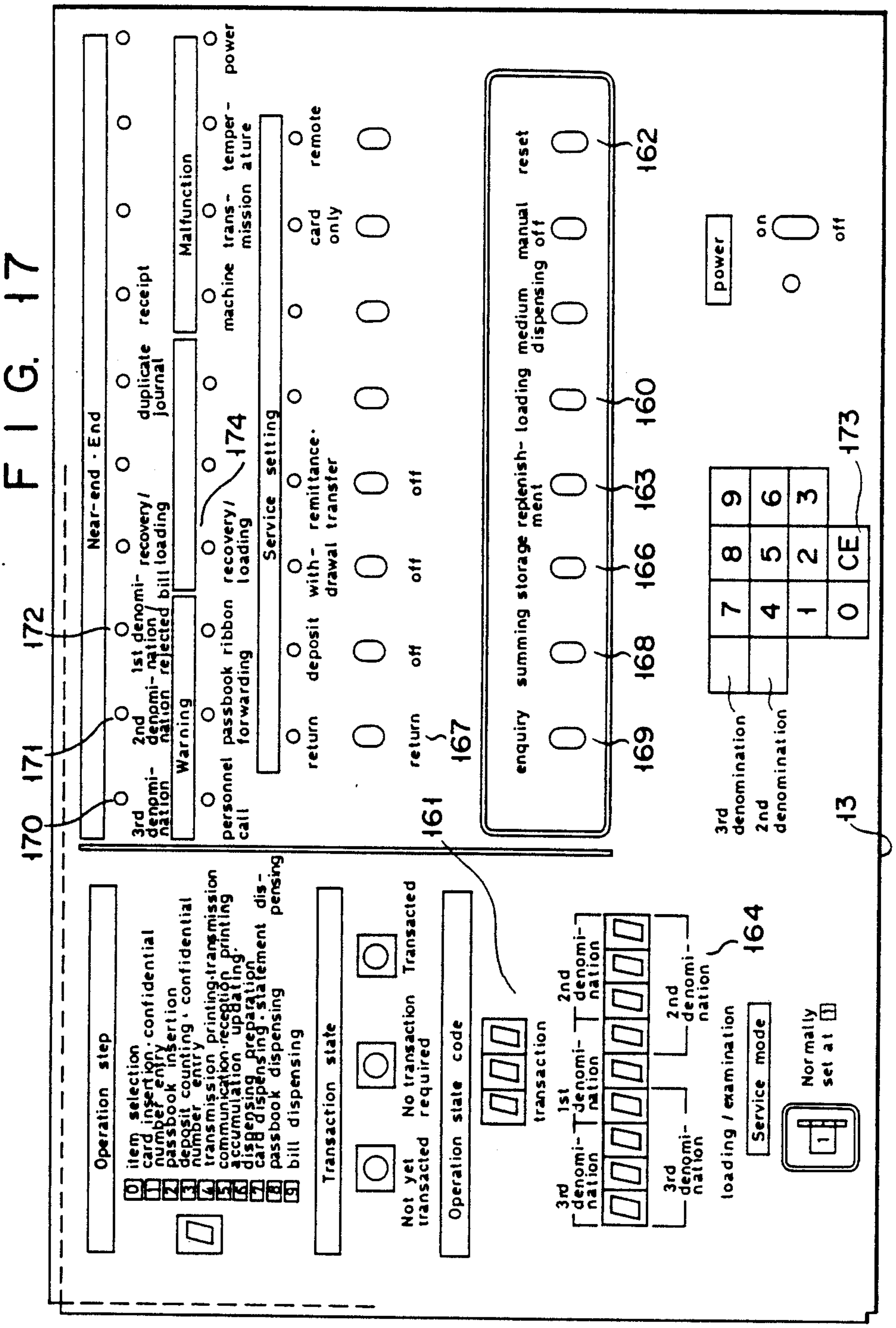
FIG. 17 is a plan view of an internal monitor of the apparatus.

The inner monitor unit 13 comprises, as shown in FIG. 17, an operating state code display 161, a reset button 162, a loading button 160, a replenishing button 163, a bill number display 164 for displaying the number of bills of each of the first to third denominations, a confirmation button 166, a final examination button 168, an enquiry button 169, a bill return button 167, an indicator 170 for indicating ending of bills of the third denomination in the third storage section 22 in a flashing state and the end of bills therein in a continuously on state, an indicator 171 for indicating ending of bills of the second denomination in the second storage section 21 in a flashing state and the end of bills therein in a continuously on state, an indicator 172 for indicating ending of bills of the first denomination in the first storage section 20 in a flashing state and the end of bills therein in a continuously on state, an indicator 174 for indicating recovery/loading, and a keyboard 173 having numerical denomination sort keys.

Figure 18:
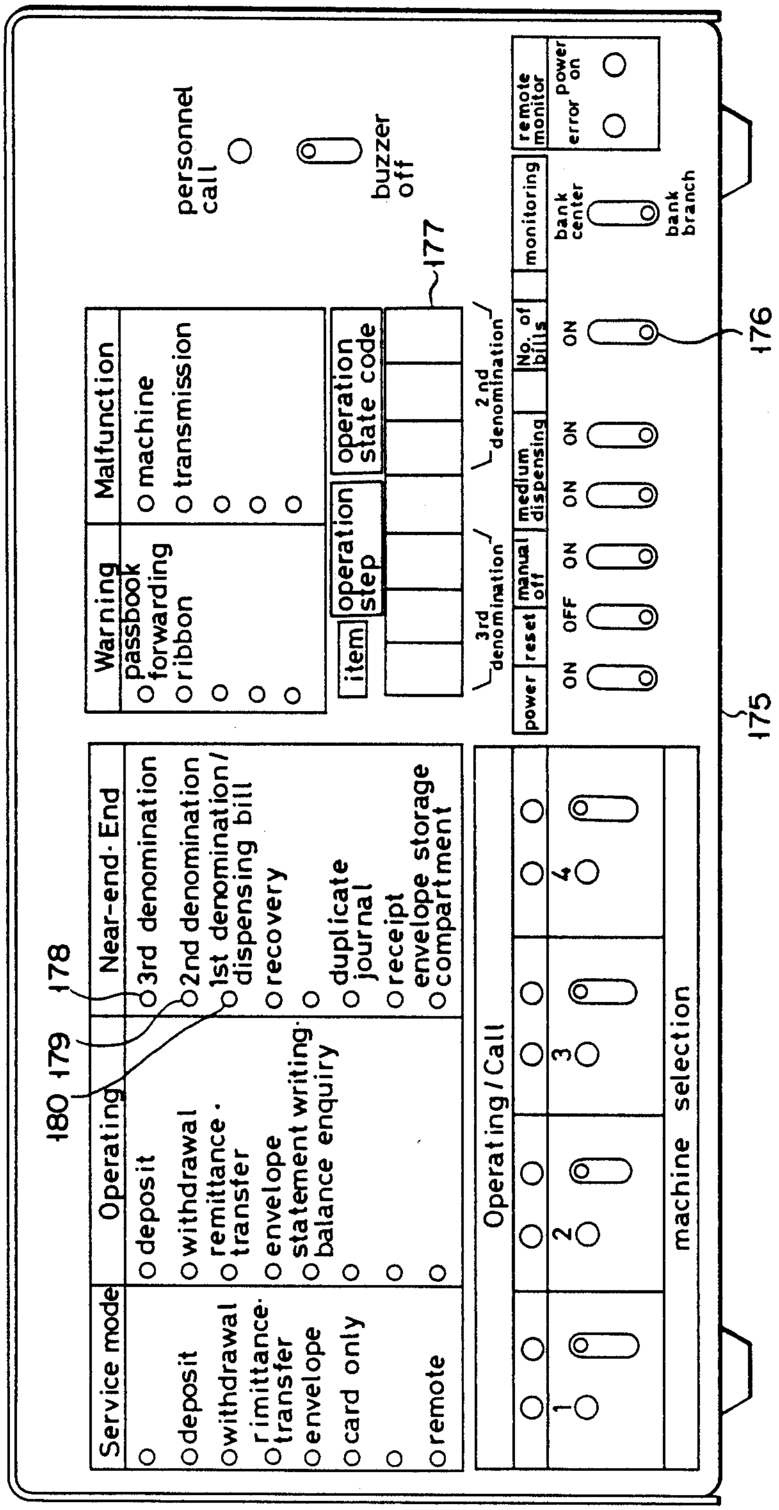
FIG. 18 is a plan view of a remote monitor of the apparatus.

The remote monitor 175 is arranged in a manner as shown in FIG. 18. The monitor 175 comprises an indicator 178 for indicating ending of bills of the third denomination in a flashing state and the end of bills in a continuously on state, an indicator 179 for indicating ending of bills of the second denomination in the second storage section 21 in a flashing state and the end of bills in a continuously on state, an indicator 180 for indicating ending of bills of the first denomination in the first storage section 20 in a flashing state and the end of bills in a continuously on state, a display 177 for displaying the number of loaded bills or the total number of bills of each of the third and second denominations, a bill number button 176 and so on.

The mode of operation of the depositing/dispensing apparatus 1 controlled by the main control section 150 will now be described.

Assume that the user (customer) refers to a message "Insert passbook or card" displayed on the CRT display unit 10 and inserts, for example, his card in the card insertion port 5. The data on the magnetic stripe of the card is read by a reader (not shown) and is supplied to the main control section 150. The main control section 150 checks the validity of the card. When the main control section 150 determines that the card is valid, it causes the CRT display unit 10 to display a message "Enter confidential number". When the customer enters his confidential number with the operation buttons 8, the main control section 150 checks if the confidential number read from the card coincides with that entered with the operation buttons 8. When a coincidence is established, or the correspondence satisfies the predetermined rules, the main control section 150 causes the CRT display 10 to display a message "Select transaction item" and items "Deposit, withdrawal, remittance/transfer, outstanding balance enquiry".

When the customer depresses a button of the operation buttons 8 which represents cash deposit, the main control section 150 is set in the deposit mode and generates a deposit command to the receiving/dispensing mechanism 12. The mechanism 12 causes the door 50 to open the receiving/dispensing port 7. The customer vertically inserts a bundle of obverse- and/or reverse-presented bills of various denominations in the bill storage chamber 51 and closes the door 50. A sensor (not shown) detects that the door 50 is closed. The main control section 150 determines that the bills are properly stored in the bill storage chamber 51 in accordance with the detection signals from the sensors **41*a* and 41*b*. Thereafter, the bills A are received, one by one, through the roller 57**.

Figure 19:
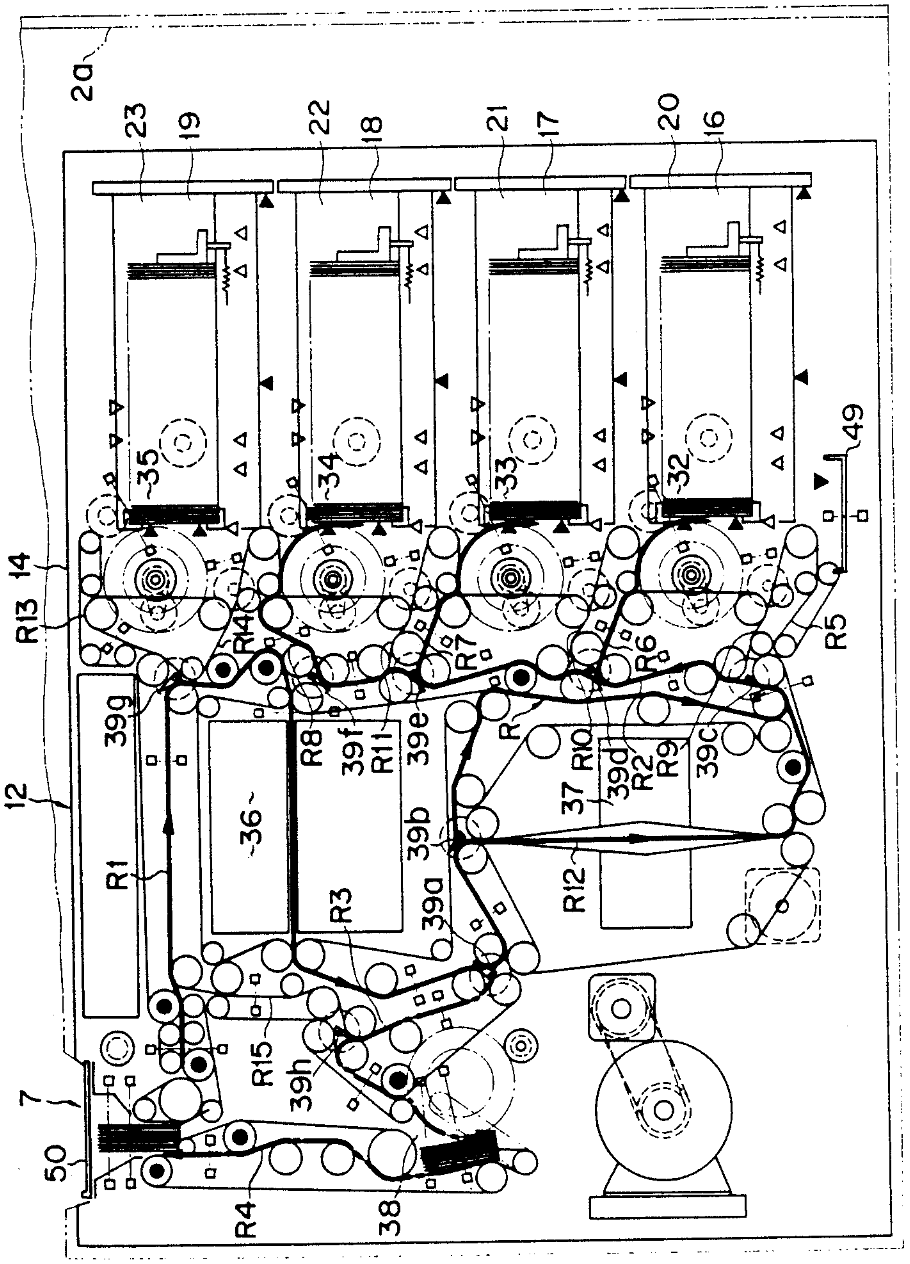
FIG. 19 is a side view showing a bill flow when bills are received.

The bill is then conveyed along the first convey path R1, as indicated by the thick line in FIG. 19. In this case, the bill A is detected by the bill flow sensor **40*a* and the main control section 150 counts the number of bills A in accordance with the output signals from the sensor 40*a*. When the bill A passes through the discrimination section 36, various detection procedures such as a "size of the bill along a convey direction", a "size of the bill along a direction perpendicular to the convey direction", a "magnetic pattern matching", a "color separation of the transmitted light", and a "divided matching of the minute bill portions in accordance with the reflected light" are performed. According to these detection results, "denomination discrimination", "true/false (authentic/counterfeit) discrimination", "fit-/unfit discrimination", and "obverse/reverse-presented bill discrimination" are performed. The discrimination results are supplied to the main control section 150**.

The main control section 150 causes a counter (not shown) to count the discrimination results. The main control section 150 generates a rejection signal to the receiving/dispensing mechanism 12 when the bill A is determined to be false (i.e., overlying bills) or a skewed bill, or a damaged bill is detected. When the leading end of such a rejected bill reaches the bill flow sensor **40*b*, the first selector gate 39*a* is pivoted to the right in response to the rejection signal, and the second convey path R2 is closed. Therefore, the bill A is conveyed along the third convey path R3 and is temporarily stacked in the temporary stacking section 38**.

On the other hand, when the bill is detected to be "true" and "reverse-presented bill" of the first denomination, the main control section 150 supplies a corresponding signal to the receiving/dispensing mechanism 12. In response to this output, the selector gates **39*a* and 39*b* are pivoted to the left and right, respectively. The third convey path R3 is closed, and the second convey path R2 is closed at the sixth branch. In this manner, the bill is sorted by the gates 39*a* and 39*b* and is conveyed to the twelfth convey path R12 (i.e., the reverse-presented bill inverting section 37) through the second convey path R2. The reverse-presented bill of the first denomination is inverted by the bill inverting section 37 and then returns to the second convey path R2. It should be noted that the selector gates 39*c* and 39*d* are, respectively, pivoted to the right and left when the reverse-presented bill has the first denomination. In this manner, the bill of the first denomination is sorted by the selector gate 39*d* and is conveyed along the sixth convey path R6. This bill is then stacked by the first stacking/dispensing unit 24 in the first temporary storage section 32, as shown in FIG. 8**.

In this case, in the first to third storage sections 20 to 23, the separator mechanisms 28, 29 and 30 are set in the deposit initial positions, as shown in FIG. 8. At the same time, the pawls 132*a* and 133*a* of the upper and lower flappers 132 and 133 hold the bill A. In this manner, the temporary storage sections 32, 33 and 34 are formed in front of the stacking/dispensing units 24, 25 and 26, respectively. Under this condition, the movable member 108 is pivoted by the pulse motor 110 about the pivot shaft 109 and is moved to the left. The bill A guided by the impellers 100 abuts against the guide 108*b* of the movable member 108 and is separated from the impellers 100. In this case, the rotating members 106 partially made of a high friction material and having central holes are rotated clockwise, and the stopper 108*b* of the movable member 108 closes the outlet port 112. Therefore, the bills A separated from the impellers 100 are aligned and stacked one by one. The alignment of the bills A along the longitudinal direction thereof is performed by a pair of aligning guide plates 144 when the bill A is separated from the impellers 100.

The selector gates 39*e* and 39*f* are pivoted to the left when the bill has the second or third denomination. The bill of the second or third denomination is stacked in the second or third temporary storage section 33 or 34. When the bill is detected to be "true" and "obverse-presented bill", the selector gate 39*b* is pivoted to the left to close the twelfth convey path R12. This bill is stacked in the corresponding one of the temporary storage sections 32, 33 and 34 without passing through the reverse-presented bill inverting section 37. The main control section 150 causes counters (not shown) to count the numbers of the bills of the first to third denominations in response to the detection signals from the bill flow sensors 40*m*, 40*n* and 40*o*, respectively, when stacking is performed.

When the absence of the bills in the bill storage chamber 51 is detected by the sensors 41*a* and 41*b*, the roller 57 is stopped, and the deposit operation is completed.

When the rejected bills are stacked in the temporary stacking section 38, the arm 92 is moved to the left. In this manner, the rejected bills are clamped between the conveyor belts 82 and 62, as indicated by the alternate long and two short dashed line, and are conveyed in the bill storage chamber 51 at once along the fourth convey path R4, as shown by the alternate long and short dashed line in FIG. 19. The rejected bills returning to and stacked in the bill storage chamber 51 are subjected to the deposit operation.

All the bills received in the apparatus are stacked and are subjected to counting. The number of bills of the first, second and third denominations discriminated by the discrimination section 36 are compared by the main control section 150 with the count values of the bill flow sensors 40*m*, 40*n* and 40*o* arranged on the convey paths R6, R7 and R8 terminating into the temporary storage sections 32 to 34. In this manner, double checking guarantees the precision of counting operation.

After the main control section 150 confirms the counts of bills in this manner, the main control section 150 causes the CRT display unit 10 to display the numbers of bills of first to third denominations and a total amount of these bills, and causes the customer to confirm the deposit amount and the numbers of bills for the respective denominations. When the customer depresses a confirmation button, the main control section 150 communicates with the central processing unit as the host computer in a on-line basis. As a result, where each deposit is accepted, the pulse motor 136 shown in FIGS. 10 and 11 is driven to rotate and vertically open the flappers 132 and 133. The bills A stored in the bill cassettes 16, 17 and 18 are urged by a spring 148 and are moved forward through a backup member 145. These bills merge with the bills stored in the temporary storage sections 32, 33 and 34 and stop together with the bills in the temporary storage sections 32, 33 and 34. Thereafter, the pulse motor 138 is driven to move the separator mechanisms 28, 29 and 30 in the forward direction. The pulse motor 136 is rotated in the reverse direction to engage with the bills A by the flappers 132 and 133 (FIG. 12).

Thus, the bills in the temporary storage sections 32, 33 and 34 are stored in the storage sections 20 to 22, respectively. The flow of bills in the deposit operation is indicated by the thick solid line and the thick alternate long and short dashed line in FIG. 19.

When the customer depresses a cancel button after he enters deposit amount data, or when the deposit procedure becomes invalid after the terminal ATM communicates with the host computer, the main control section 150 generates a return command to the receiving/dispensing mechanism 12 to return the bills to the customer. The bills A stored in the temporary storage sections 34, 33 and 32 are dispensed in an order of the third to first denominations. All these bills are stacked in the temporary stacking section 38. The pulse motor 136 for horizontally driving the separator mechanisms 28, 29 and 30 is deenergized. Therefore, the holding force by the pulse motor 136 is released to urge the upper and lower flappers 132 and 133 together with the bills A through the backup member 145 by means of the biasing force of the spring 146. The bills A in the temporary storage section 32, 33 and 34 are urged, one by one, toward the impellers 100. Subsequently, when the movable member 108 is pivoted to the right, the bill A is clamped between the movable member 108 and the pawls 132*a* and 133*a* of the flappers 132 and 133 (FIG. 13).

The vacuum pump (not shown) is operated and the rotating members 106 is rotated clockwise. When the suction holes 106*a* of the rotating members 106 oppose the through hole 107*a* (open through an angle range of about 45 degrees in the pivot direction of the rotating members 106) of the shaft 107 which communicates with the vacuum chamber, the bill A is attracted to the rotating members 106, thus starting dispensing. When the rotating members 106 are turned through an angle of 45 degrees, suction through the suction holes of the rotating member 106 is stopped, so that the leading end of the bill A is inserted between the rotating members 106 and the belt 119. In this manner, the bill is dispensed from the temporary storage section 32, 33 or 34.

The overlying bill reception prevention is performed such that the bills A are attracted to the overlying bill reception preventing roller 113 which has a hollow center communicating with the vacuum chamber and which has an opening facing the bill A. The suction of the bill A by the roller 113 continues until the lower end of the bill A is supported by the flapper 133. Therefore, the bill A will not drop from the outlet port 112.

The end of storage operations in the cassettes 16, 17 and 18 is detected when the separator mechanisms 28, 29 and 30 are retracted and the sensors 41*e*, 41*f* and 41*g* generate the "bright" signals.

Figure 20:
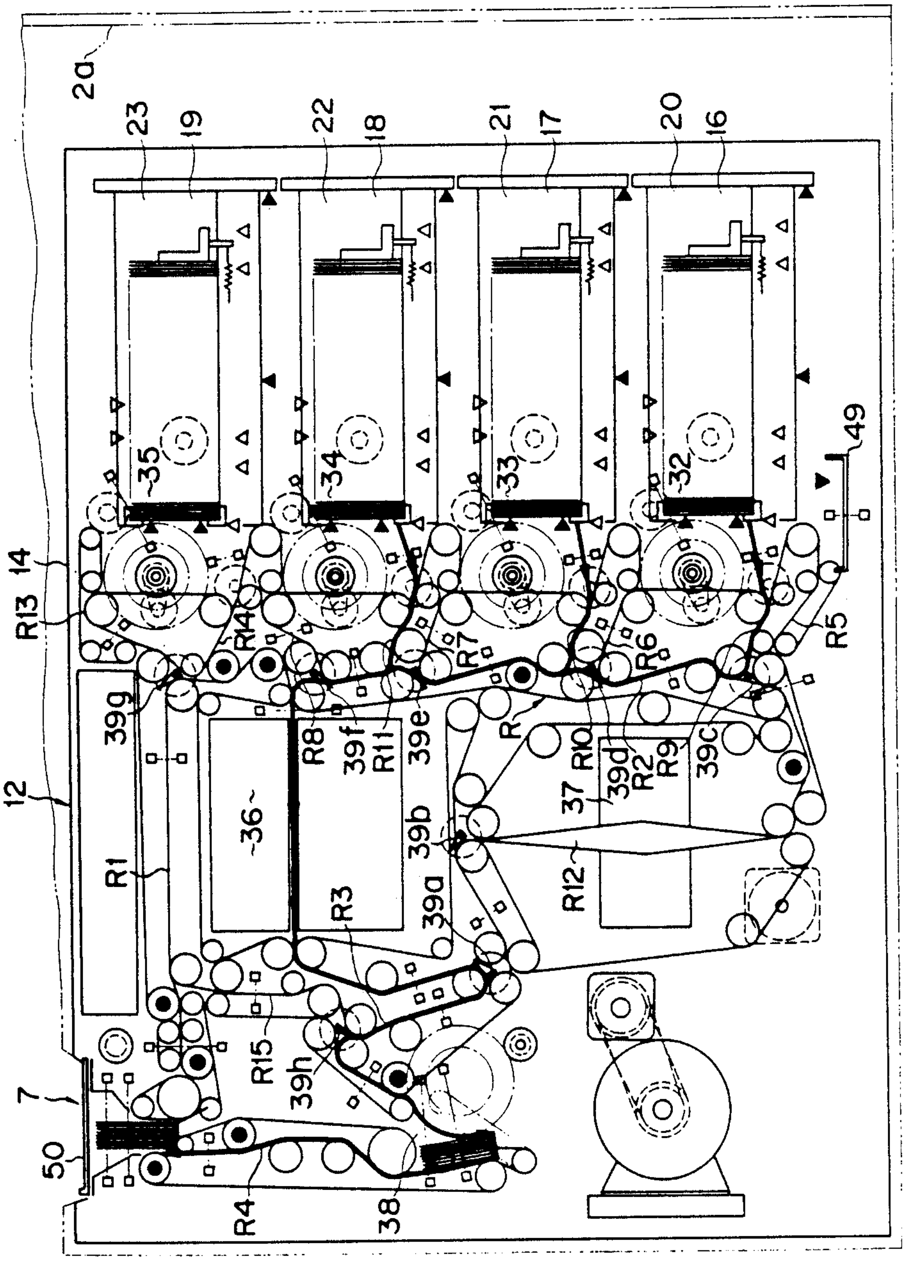
FIG. 20 is a side view showing a bill flow when received bills are returned to the customer.

As indicated by the thick solid line in FIG. 20, the received bills (deposit) taken out from the temporary storage sections 32, 33 and 34 are conveyed, one by one, along the rear half portion of the second convey path R2, the rear half portion of the first convey path R1 and the third convey path R3 and are stored in the temporary stacking section 38. After all the received bills are stacked in the temporary stacking section 38, the bills A are simultaneously conveyed in the bill storage chamber 51, as shown in FIG. 17. Thereafter, the bills A are popped up by a bill dispensing mechanism (popup mechanism) from the bill storage chamber 51 to the receiving/dispensing port 7 to permit the customer to remove the bills. In this case, the main control section 150 causes the CRT display unit 10 to display a message "Deposit is returned". The flow of the return operation is given by the solid line in FIG. 20.

All the received bills (deposit) are temporarily stacked in the temporary stacking section 38 in the automatic return mode regardless of the operating conditions, and the bills are collectively conveyed into the bill storage chamber 51. The bills are returned by the bill dispensing mechanism (popup mechanism) shown in FIG. 6 to the corresponding customer. The bills to be returned to the customer are not discriminated by the discrimination section 36. Although the discrimination section 36 can perform the operation for the bills to be returned in the same manner as in the case of received bills (deposit), the discrimination section 36 is not used because a recovery means becomes complicated when the number of received bills does not coincide with the number of bills to be returned. In addition, when overlying bills are detected at the time of reception, the number of received bills cannot be identified with the number of bills to be returned.

The bill receiving/dispensing mechanism 12 is arranged to be adapted to provide a retry recovery means.

When the customer depresses a "withdrawal" button of the operation buttons 8 at the time of transaction item selection, the main control section 150 causes the CRT display unit 10 to display a message "Enter withdrawal amount and press end button". The customer enters a withdrawal amount with the operation buttons 8. The main control section 150 causes the CRT display unit 10 to display a message "Press confirmation button or exchange button if the displayed amount is correct, or press cancel button if the amount is incorrect". Upon depression of one of confirmation and exchange buttons, the main control section 150 causes the CRT display unit 10 to display a message "Busy. Please wait". Meanwhile, the main control section 150 communicates with the host computer on an on-line basis and generates a withdrawal command to the bill receiving/dispensing mechanism 12. In response to this command, the bill receiving/dispensing mechanism 12 causes the storage sections 21 and 22 to dispense bills of predetermined denominations so as to correspond to the required withdrawal amount. The dispensed bills are stacked in the temporary stacking section 38.

The flappers 132 and 133 of each of the separator mechanisms 30 and 29 of the third and second storage sections 22 and 21 are opened by the pulse motor 136. The pulse motor 110 is then started, so that the movable member 108 is pivoted in the clockwise direction. As shown in FIG. 14, a space of 0.5 to 1.5 mm is formed between the bill A and each of the rotating members 106.

When a vacuum pump is operated to dispense the bill A from the third storage section 22, a vacuum pressure inside the hollow shaft 107 is increased. The conveyor belt 119 which constitutes the eleventh convey path R11 is travelled, so that the rotating members 106 as the dispensing mechanism start rotation. In this manner, the bill is dispensed.

Figure 21:
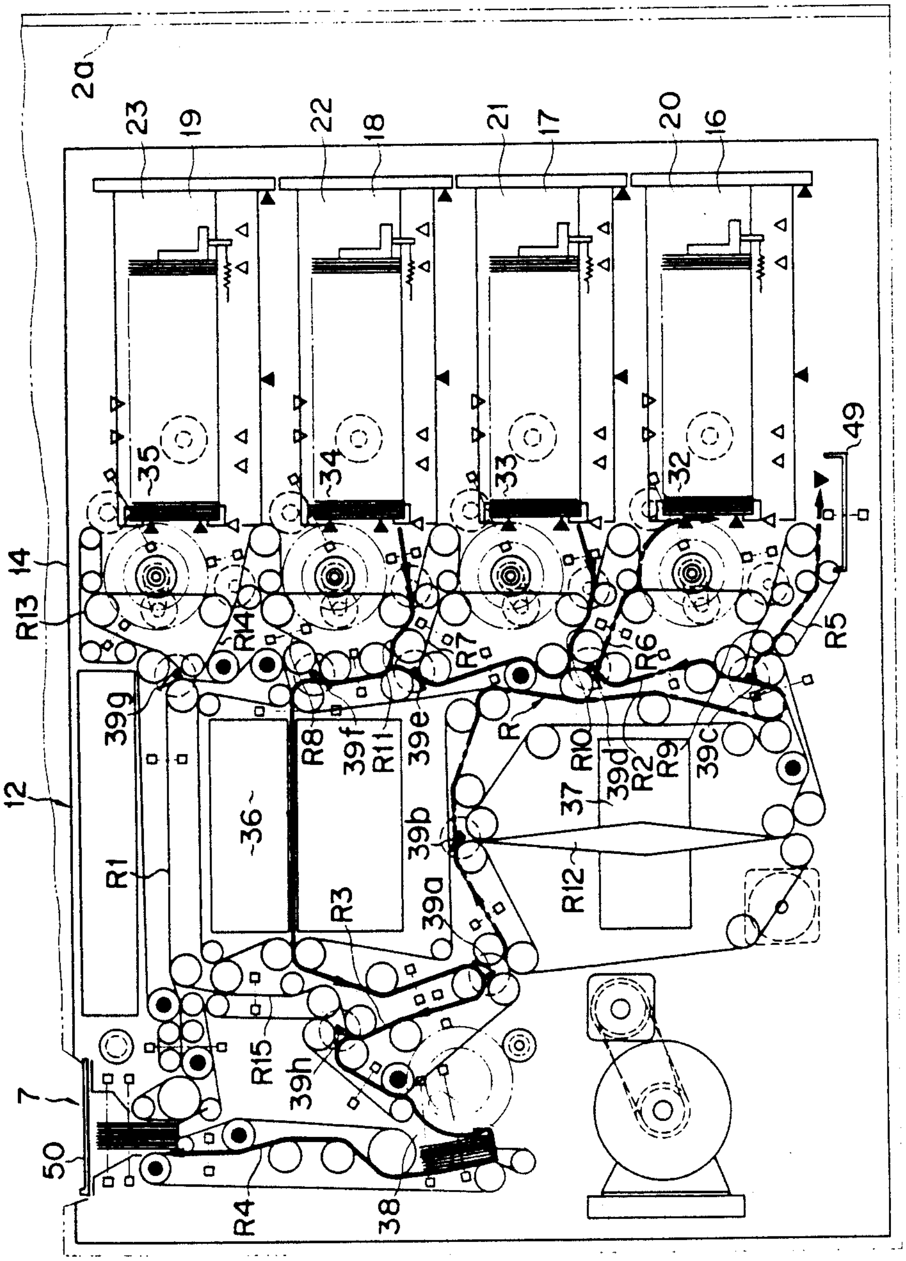
FIG. 21 is a side view showing a bill flow when bills are dispensed to the customer.

The bill is sequentially gated through the selector gates 39f, 39g and 39h and is conveyed through the rear half portion of the second convey path R2, the rear half portion of the first convey path R1 and the third convey path R3, as indicated by the thick solid line in FIG. 21. The thus conveyed bill is stacked in the temporary stacking section 38. In this case, the bill of the third denomination which is dispensed from the third storage section 22 is detected by the bill flow sensor 40r. The main control section 150 counts the number of bills dispensed from the third storage section 22 in accordance with the detection signal from the sensor 40r. The bill dispensed from the second storage section 21 is detected by the bill flow sensor 40q, and the main control section 150 counts the number of bills dispensed from the section 21 in accordance with the detection signal from the sensor 40q. When the bill passes through the discrimination section 36, it is subjected to "denomination discrimination" and the like. The discrimination results are supplied to the main control section 150. The main control section 150 causes a counter (not shown) to count the number of the bills passing through the discrimination section 36 by the discrimination results. The bills stacked in the temporary stacking section 38 are subjected to stacking detection by the bill flow sensor 40f. In response to this detection signal from the bill flow sensor 40f, the main control section 150 counts the number of bills stacked in the temporary stacking section 38.

When the counts of the bill flow sensors 40r and 40q coincide with the preset numbers, respectively, the main control section 150 causes the bill receiving/dispensing unit 15 to stop dispensing bills from the storage sections 22 and 21. The main control section 150 performs an identification operation as to whether or not a total number of bills of the second and third denominations in accordance with the discimination result coincides with the count of the bill flow sensor 40f.

As described above, the bill A is subjected to "denomination discrimination" in the discrimination section 36, so that the bill is rechecked as a bill dispensed from the corresponding one of the storage sections 22 and 21. Although this denomination discrimination need not be performed, the possibility exists that bank personnel may erroneously replenish the bills. For this reason, this denomination rediscrimination is preferred.

The "fit/unfit discrimination" is performed in the service mode at the time of cash deposit such that selection of bills in accordance with fit/unfit bills is required. Especially, in the cash deposit operation, any damaged bill which is contaminated, partially worn or applied with adhesive tape is preferably accepted if it can be discriminated to be "authentic". In this case, the service mode is set such that damaged bills are stored in either the third and second storage sections 22 and 21 so as to use them as bills to be dispensed, or in the first storage section 20 as rejected bills. In the former case, the bills must be rechecked for fit/unfit bills. In the latter case, the "fit/unfit discrimination" need not be performed.

In either case, unfit bills must not be dispensed to the customer.

When "fit/unfit discrimination" is performed, the unfit bill is regarded as a bill which cannot be recycled and is rejected as a rejected bill into the first storage section 20. In practice, when a bill to be rejected is detected, the selector gate 39a is pivoted to the left to close the third convey path R3, and the selector gate 39*b* is povited to the left to close the twelfth convey path R12. The rejected bill is then stored in the first storage section 20 through the second and sixth convey paths R2 and R6 without passing through the reverse-presented bill inverting section 37, as indicated by the thick alternate long and short dashed line. It should be noted that the rejected bill can be stored in the rejected bill stacking section 49 through the second and fifth convey paths R2 and R5, as shown by the thick dotted line in FIG. 21.

The flow of bills in the withdrawal operation is shown in FIG. 21.

When detected bills are rejected, the bills of the predetermined denominations which correspond to the number of rejected bills must be replenished. Therefore, bills are dispensed from the second and third storage sections.

Figure 7:
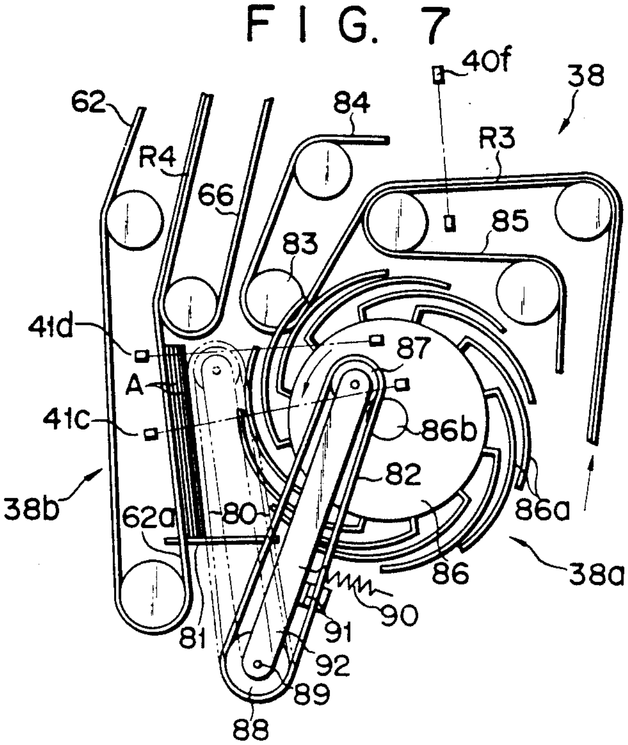
FIG. 7 is a side view of a temporary stacking section of the apparatus.

Thereafter, the bills stacked in the temporary stacking section 38 are collectively fed by the mechanism shown in FIG. 7 and are stored in the bill storage chamber 51. As a result that the main control section 150 communicates with the host computer on an on-line basis, when the withdrawal operation is permitted, the bills A are clamped by the bill dispensing mechanism (FIG. 6) and are lifted by the arm 71. The bills A partially extend through the bill receiving/dispension port 7, so that the customer can remove the bills.

On the other hand, when the withdrawal operation is not permitted as a result of the communication between the main control section 150 and the host computer, the bills stacked in the temporary storage chamber 51 are discriminated in the discrimination section 36, one by one, and are stored in the storage sections 22 and 21 in accordance with the predetermined denominations.

While the communication between the main control section 150 and the host computer is started (i.e., before permission/nonpermission for the withdrawal transaction is determined), the bills are conveyed for withdrawal, so that the time for one transaction can be greatly shortened, thereby improving the utilization efficiency of the machine. Furthermore, even if the transaction is not permitted, the bills can be stored in the corresponding storage sections. As a result, no problem is presented.

Figure 22:
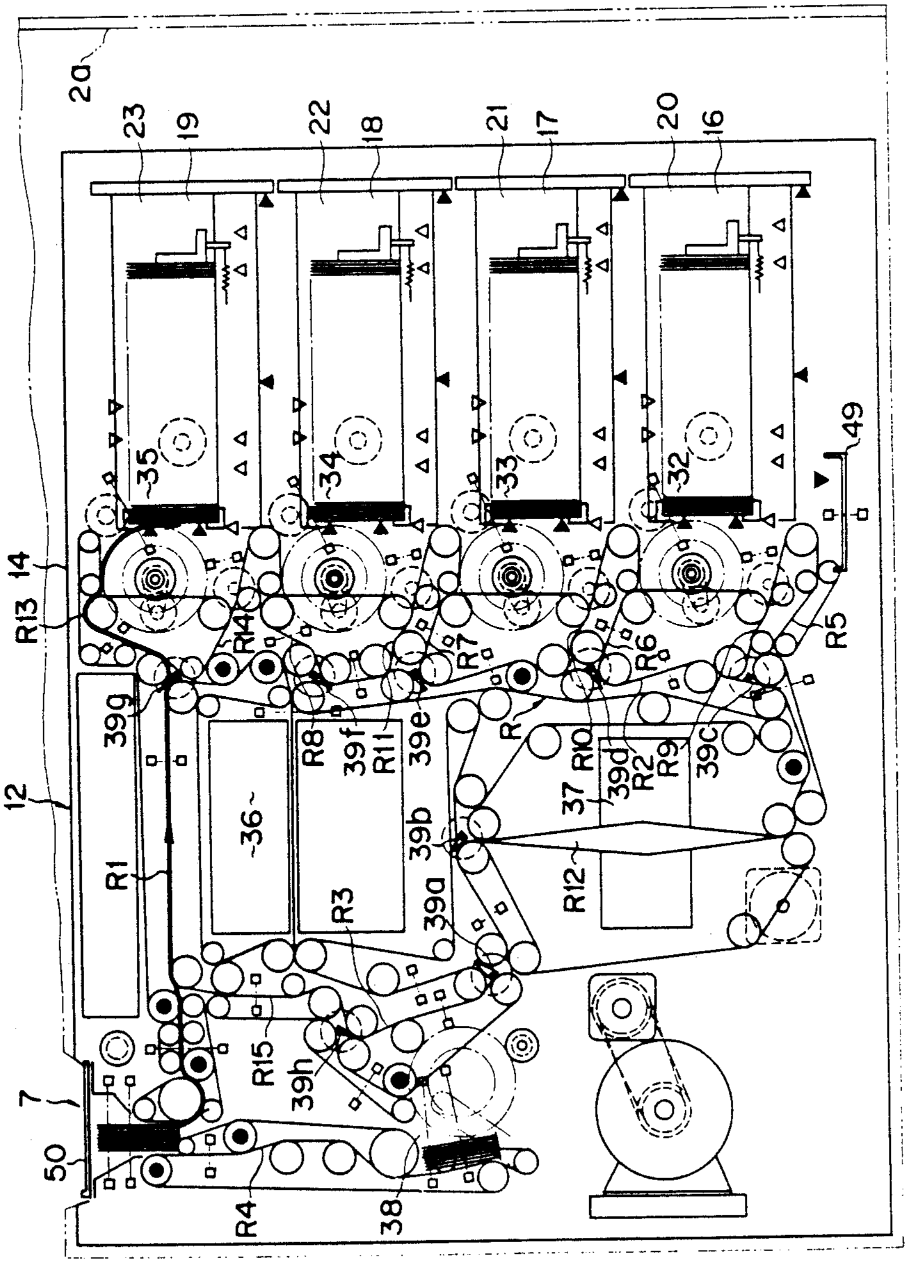
FIG. 22 is a side view showing a bill flow when dispensed bills are recovered.

The bill recovery operation is described with reference to the bill flow given by the thick solid line in FIG. 22 when the bills (withdrawal) to be removed by the customer are dispensed by the dispensing mechanism shown in FIG. 6, the bills (deposit) are automatically returned to the customer, and the bills (deposit) are rejected bills and are dispensed.

When the customer forgets to remove the dispensed bills after a predetermined period of time has elapsed, recovery operation is performed. In the dispensing mechanism shown in FIG. 6, the bills A clamped between the first and second conveyor belts 53 and 54 and extended through the receiving/dispensing port 7 are conveyed by a drive source (not shown) in the direction opposite to the dispensing direction indicated by the arrow, and are returned to the bill storage chamber 51. When the sensor 41*b* generates a "bright" signal and the sensor 41*a* generates a "dark" signal, the bills are completely stored in the bill storage chamber 51. At this time, the solenoid 73 is deenergized, and the arm 71 mounted on the pulley 64 around which the second conveyor belt 54 is looped returns to the initial position. Meanwhile, the door 50 is automatically closed to close the bill receiving/dispensing port 7. Thereafter, as shown in the normal deposit transaction operation shown in FIG. 4, the bills A are conveyed one by one along the first convey path R1. At this time, the selector gate 39*g* is pivoted to the left to close the first convey path R1 at the seventh branch and open the thirteenth convey path R13. In this manner, the bills conveyed, one by one, are stacked in the temporary storage section 35 of the fourth storage section 23 through the front half portion of the first convey path R1 and the thirteenth convey path R13, as indicated by the thick solid line in FIG. 22. When all the bills are recovered, they are stored from the temporary storage section 35 to the fourth storage section 23 in a manner shown in FIG. 12.

In the service mode wherein recovery operations continue until the fourth storage section 23 is filled with recovered bills, there are a first mode wherein the recovered bills are not corresponded to the transaction, and a second mode wherein the recovered bills are corresponded to the transaction. In the second mode, the recovered bills of the first transaction are stored in the fourth storage section 23, the recovered bills of the second transaction are stored in the temporary storage section 35 partitioned in the fourth storage section 23 by the separator mechanism 31, and the recovered bills of the third transaction are held in the bill storage chamber 51. In this manner, the apparatus need not be interrupted to perform up to two recovery procedures.

In the above embodiment, the recovered bills are directly conveyed to the fourth storage section 23 without being passed through the discrimination section 36. However, an alternate arrangement may be provided such that the selector gate 39*g* is pivoted to the right to discriminate the recovered bills by the discrimination section 36 through the first convey path R1, that the recovered bills are collectively stacked in the temporary stacking section 38 and then in the bill storage chamber 51, and that the selector gate 39*g* is pivoted to the left to store the recovered bills in the fourth storage section 23.

In addition, the recovered bills can be subjected to discrimination and counting in the same manner as deposited bills, and can be stored in the storage sections 20, 21 and 22 in accordance with the predetermined denominations.

The bill loading operation will be described with reference to the flow charts of FIGS. 23A to 23D and the bill flow shown in FIG. 24.

Every morning bank personnel load a mixture of bills of the second and third denominations that they consider will be required that day in the fourth storage section 23 of the fourth bill cassette 19. The fourth storage section 23 is set in the bill receiving/dispensing mechanism 12. The personnel depress the loading button 160 of the internal monitor unit 13 (ST1). Upon depression of the loading button 160, the main control section 150 checks whether or not any bills are left in the temporary storage sections 32, 33 and 34, the temporary stacking section 38, the bill storage chamber 51 and the convey paths R1 to R15 in response to detection signals from the sensors 41*e*, 41*f*, 41*g*, 41*c* and 41*b* and the sensors 40*a* to 40*u* (ST2). If any bill is left in any part of the above components, the main control section 150 causes the CRT display unit 10 to display an error code on the operating state code display 161 of the internal monitor unit 13 and generates an alarm (ST3). Upon generation of the alarm, the bank personnel remove bills from the above components (ST4). In this case, when the replenishing button 163 is depressed (ST22), the replenishing operation to be described later is performed. At this time, the main control section 150 causes the CRT display section 10 to display a message "Loading. Please wait".

The main control section 150 then checks in response to the detection signal from the sensor 41*h* whether or not a bill is present in the fourth storage section 23 (ST5). If it is determined that no bill is present, the main control section 150 causes the operating state code display 161 of the internal monitor unit 13 to display an error code representing the absence of any bill and to generate an alarm (ST6). Upon display of this indication and generation of the alarm, the personnel enter a mixture of bills of the second and third denominations in the fourth storage section 23 of the fourth bill cassette 19 (ST7). In this case, since the loading button 160 has already been depressed, it is detected to be NO (ST8) when it is checked whether or not the bills are replenished during servicing of the machine, and the routine advances to the next step (ST9A).

When the bill are sufficiently present and no residual bill is present in the machine, the main control section 150 causes the bill receiving/dispensing mechanism 12 to dispense bills, one by one, from the storage section 23 in the same manner as the deposit transaction operation (ST9A). The bill is then conveyed along the fourteenth convey path R14 and the rear half portion of the first convey path R1 and passes through the discrimination section 36. The discrimination section 36 discriminates the bill (ST9B) and the discrimination result is supplied to the main control section 150. The main control section 150 causes the counter to count the number of bills of the second and third denominations by the discrimination results and checks whether the bills are "authentic". Therefore, the authentic bills passed through the discrimination section 36 are stacked in the corresponding temporary storage sections 34 and 33 (ST9C). In practice, the selector gate 39*a* is pivoted to the left, and the authentic bills passed through the discrimination section 36 are conveyed toward the corresponding storage sections 21 and 22 through the second convey path R2, as indicated by the thick solid line in FIG. 24. On the other hand, the rejected bills passed through the discrimination section 36 are conveyed in the temporary stacking section 38 through the third convey path R3 since the selector gate 39*a* is pivoted to the right (ST9D).

When the third temporary storage section 34 or the second temporary storage section 33 is filled with 100 bills, or when the fourth storage section 23 becomes empty (ST9E), the fourth storage section 23 temporarily stops dispensing the bills (ST9F), and the bills stacked in the temporary storage section 33 or 34 are stored in the second or third storage section 21 or 22 (ST10). When this storage operation is completed and the bills are still left in the fourth storage section 23, the bills are dispensed from the fourth storage section 23. When the temporary storage sections 33 or 34 is filled again with 100 bills, the dispensing operation is temporarily stopped, so that the bills in the temporary storage section 33 or 34 are stored in the corresponding storage section. This operation continues until the fourth storage section 23 becomes empty. The empty-state sensor 42 thus detects the absence of bills in the fourth storage section 23, and at the same time the sensor 41*h* generates the "bright" signal (ST11). When the last bill is conveyed and all bills are stacked in the temporary storage section 33 or 34, the main control section 150 detects that no residual bill is present along the convey paths R1 to R15 in response to the detection signals from the sensors 40*a* to 40*u*. As a result, the respective convey members are stopped.

Figure 24:
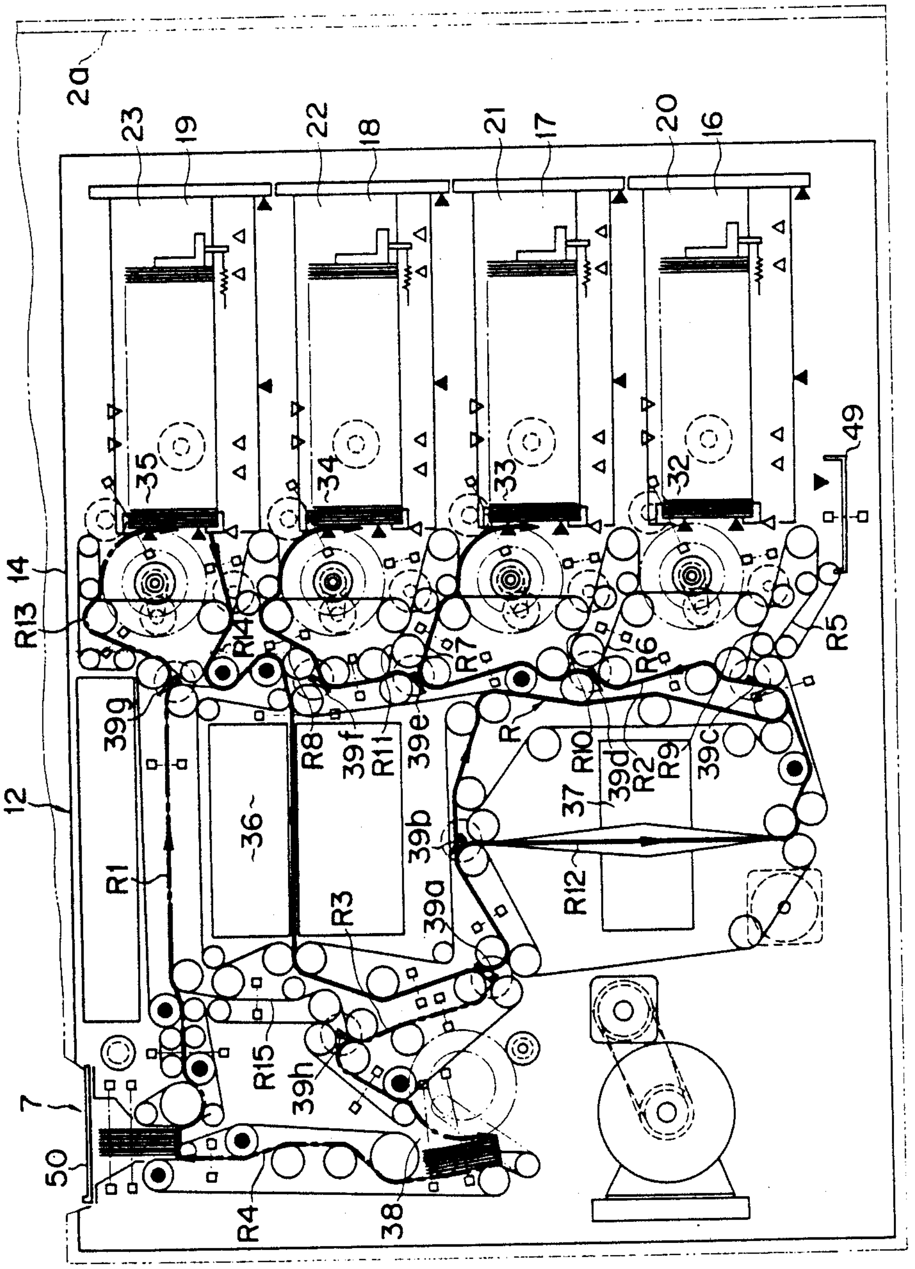
FIG. 24 is a side view showing a bill flow when the bills are loaded.

Thereafter, the main control section 150 is operated to collectively convey the bills stacked in the temporary stacking section 38 to the bill storage chamber 51, as indicated by the thick alternate long and short dashed line in FIG. 24 (also see FIG. 7). The bills in the bill storage chamber 51 are conveyed, one by one, in the same manner as in the recovery operation and are stacked in the temporary storage section 35 of the fourth storage section 23. Upon detecting that no residual bill is present, the bills are stored in the fourth storage section 23 (ST12).

Figure 25:
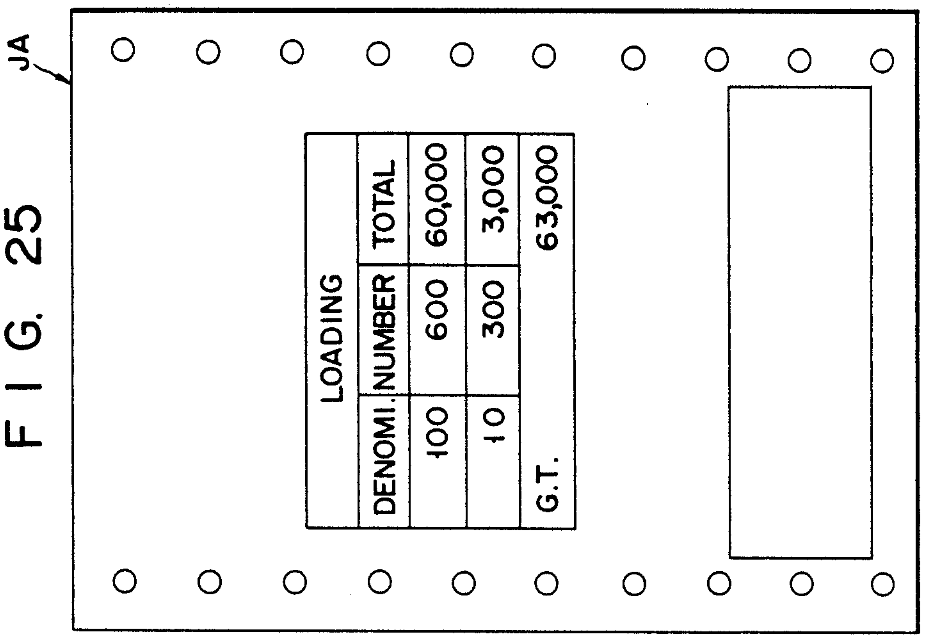
FIG. 25 is a plan view showing a printed journal when bills are loaded.

When a series of loading procedures are performed as described above, the main control section 150 causes the printer (not shown) in the card/receipt processing unit 11 to print the loading content (i.e., the number of bills of the second and third denominations, and their total amount) on a journal JA and to issue the printed journal, as shown in FIG. 25. At the same time, the main control section 150 causes the bill number display 164 of the internal monitor unit 13 to display the number of bills of each of the second and third denominations (ST13). When a rejected bill is returned to the fourth storage section 23, the main control section 150 causes a recovery/loading indicator 174 to signal to the bank personnel.

Upon signaling of the recovery/loading indicator 174, the bank personnel remove the bills returned to the fourth storage section 23 by removing the fourth bill cassette 19 from the apparatus 1 and count the number of returned bills. The bank personnel identify the initially preset number of bills of each of the denominations, and their amounts in accordance with the count of bills, the printed content of the journal JA and the display content of the internal monitor unit 13. When confirmation is completed, the bank personnel depress the confirmation button 166 of the internal monitor unit 13 (ST14A). In this manner, the bills stacked in the temporary storage sections 33 and 34 are stored in the corresponding storage sections 21 and 22 (ST14B), thus completing the loading operation.

When the personnel over/underload the bills during loading or when an identification cannot be performed due to personnel's miscalculation, the personnel depress the bill return button 167 of the internal monitor unit 13 (ST15A). In this case, all the bills loaded in the second and third storage sections 22 and 23 and the temporary storage sections 34 and 33 are dispensed one by one in the same manner as in the withdrawal transaction operation and are conveyed in the discrimination section 36 through the tenth convey path R10 or the eleventh convey path R11, the rear half portion of the second convey path R2, and the rear half portion of the first convey path R1 as indicated by the thick solid line in FIG. 26. The selector gates 39*a*, 39*h* and 39*g* are pivoted to the right, left and right, respectively. Therefore, the bills passing through the discrimination section 36 are conveyed in the third convey path R3 in accordance with the right position of the selector gate 39*a* and are conveyed in the fifteenth convey path R15 in accordance with the left position of the selector gate 39*h*.

Figure 26:
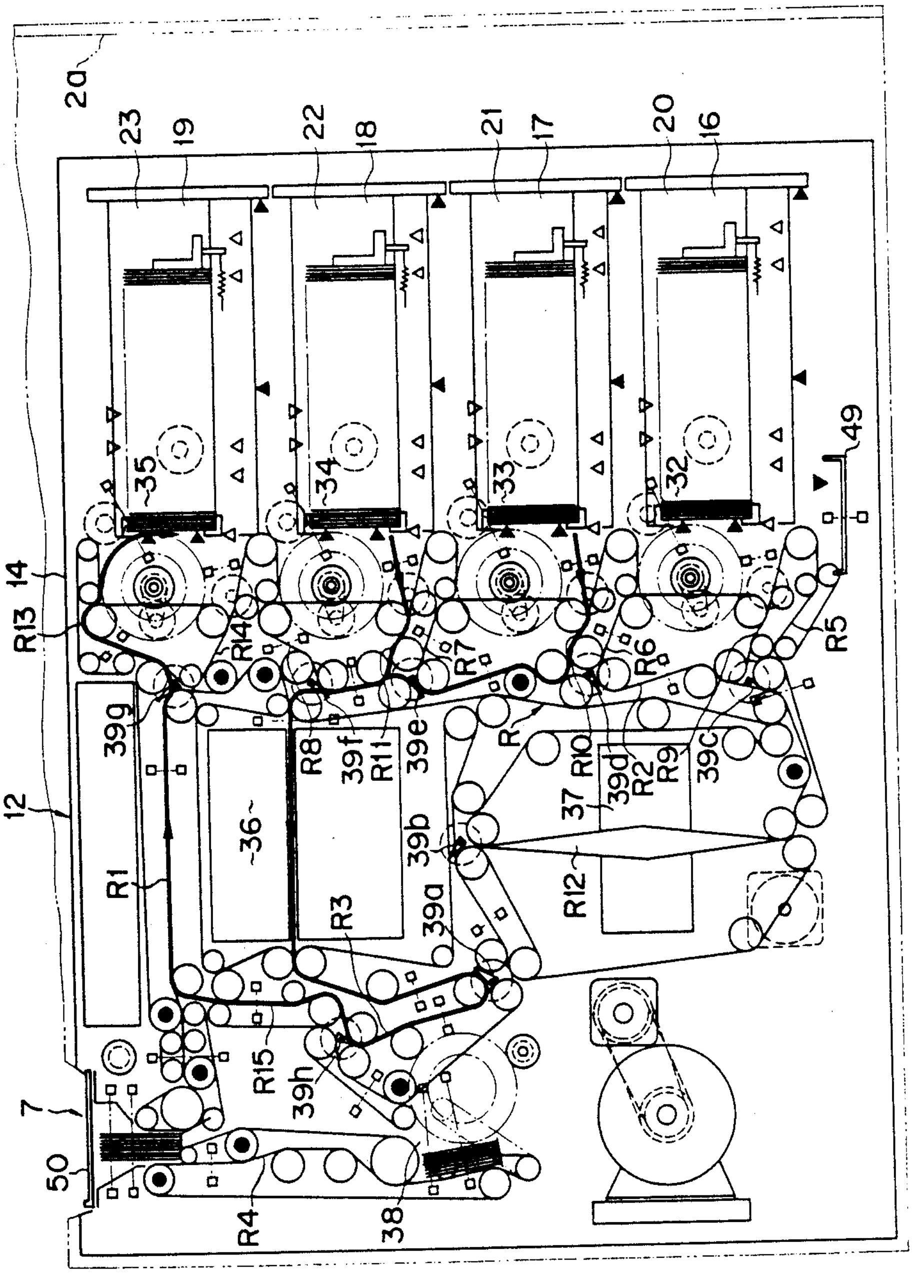
FIG. 26 is a side view showing a bill flow of return operation at the time of bill loading.

Thereafter, the bills are conveyed from the fifteenth convey path R15 to the first convey path R1 and are conveyed in the thirteenth convey path R13 in accordance with the left position of the selector gate 39g. The returned bills are then stored in the temporary storage section 35 of the fourth storage section 23 and then in the fourth storage section 23. This operation is repeated in the same manner as in loading every time 100 bills are stacked, so that the third and second storage sections 22 and 21 and the corresponding temporary storage sections 34 and 33 become empty. The above operation is repeated until no more bills are conveyed along the convey path (ST15B), thus completing return operation at the time of loading. The flow of bills in the return operation at the time of loading is illustrated in FIG. 26.

Figure 23A:
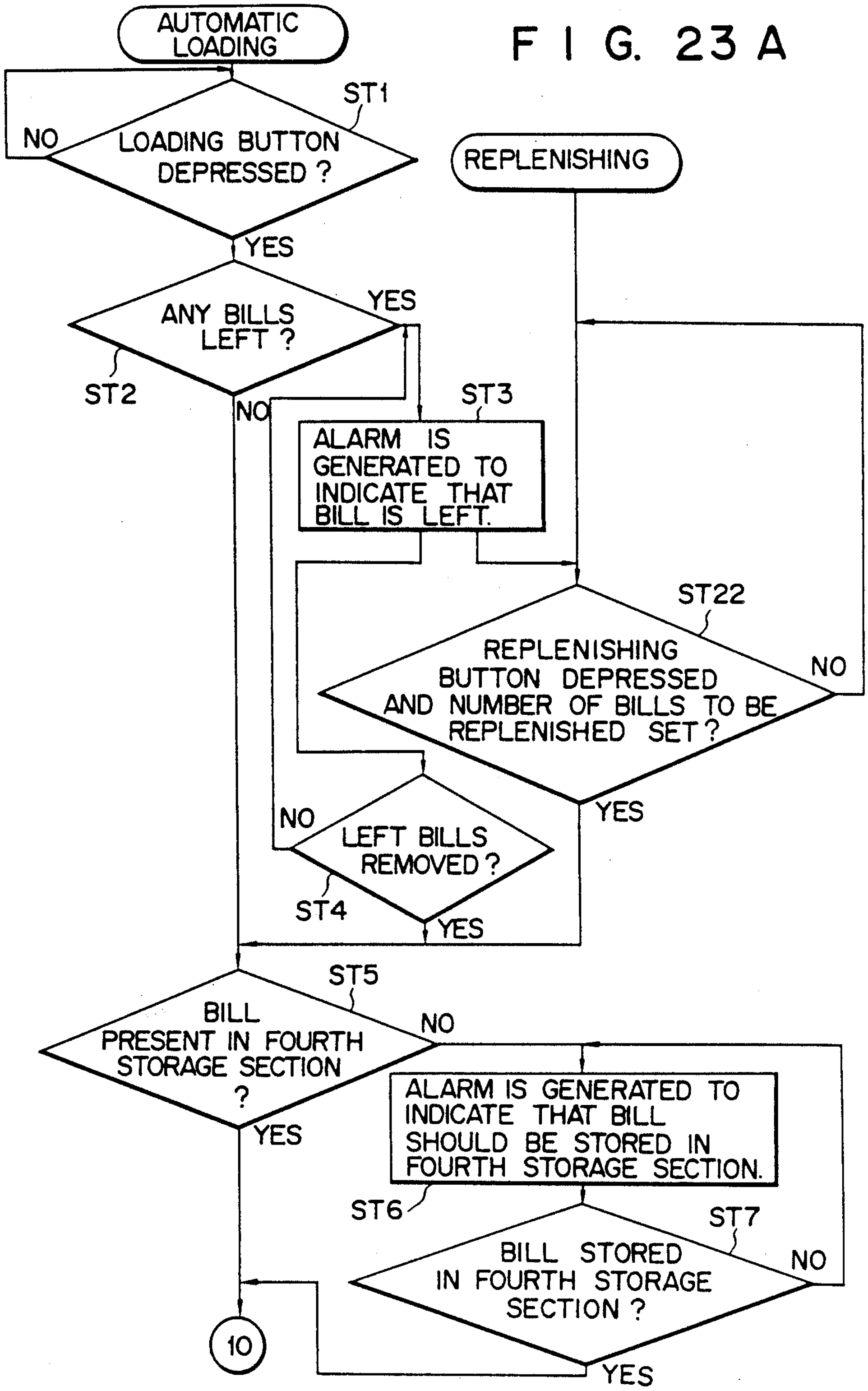
FIGS. 23A to 23D flow charts for explaining the loading operation.
Figure 23B:
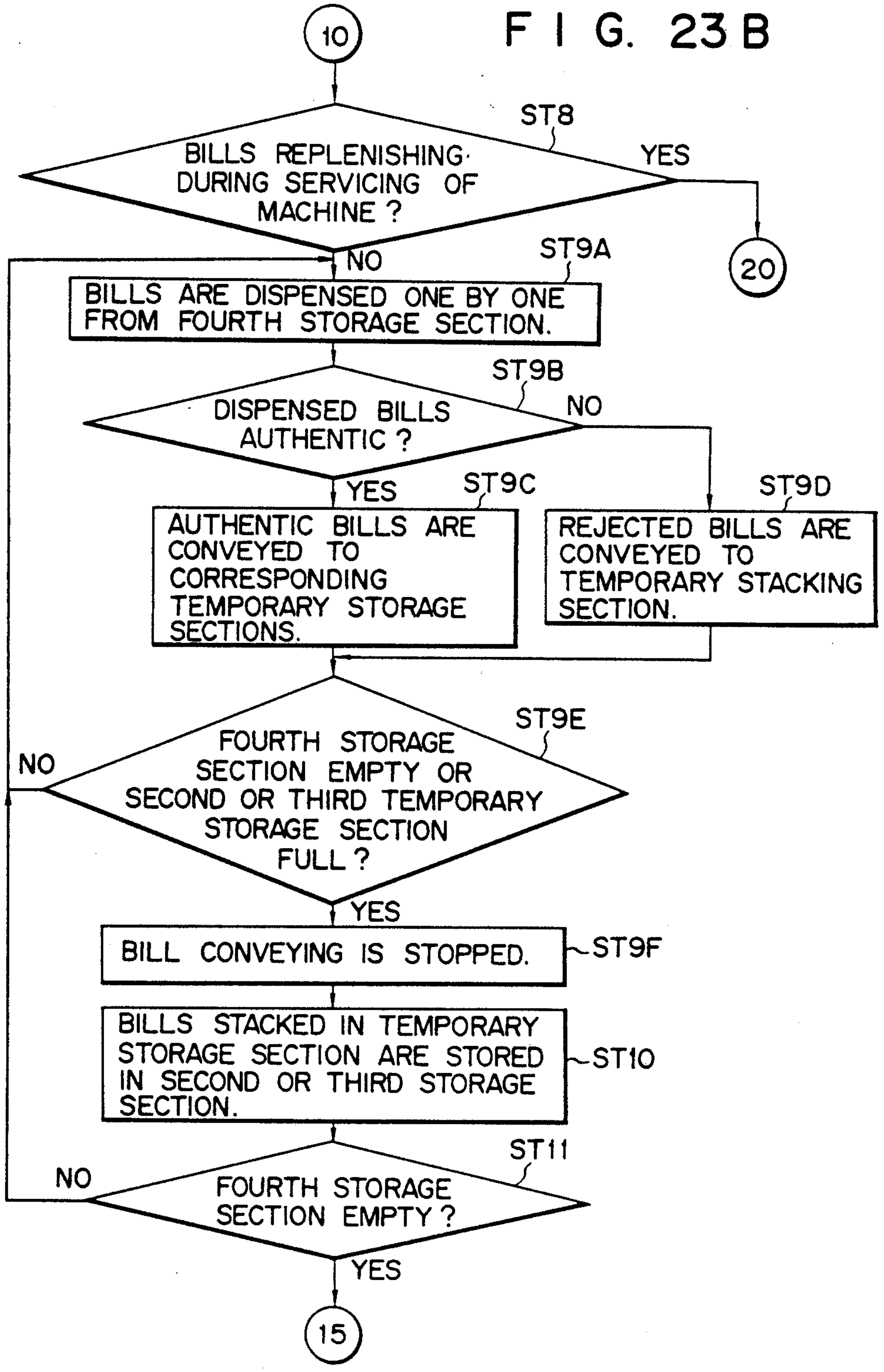
Figure 23C:
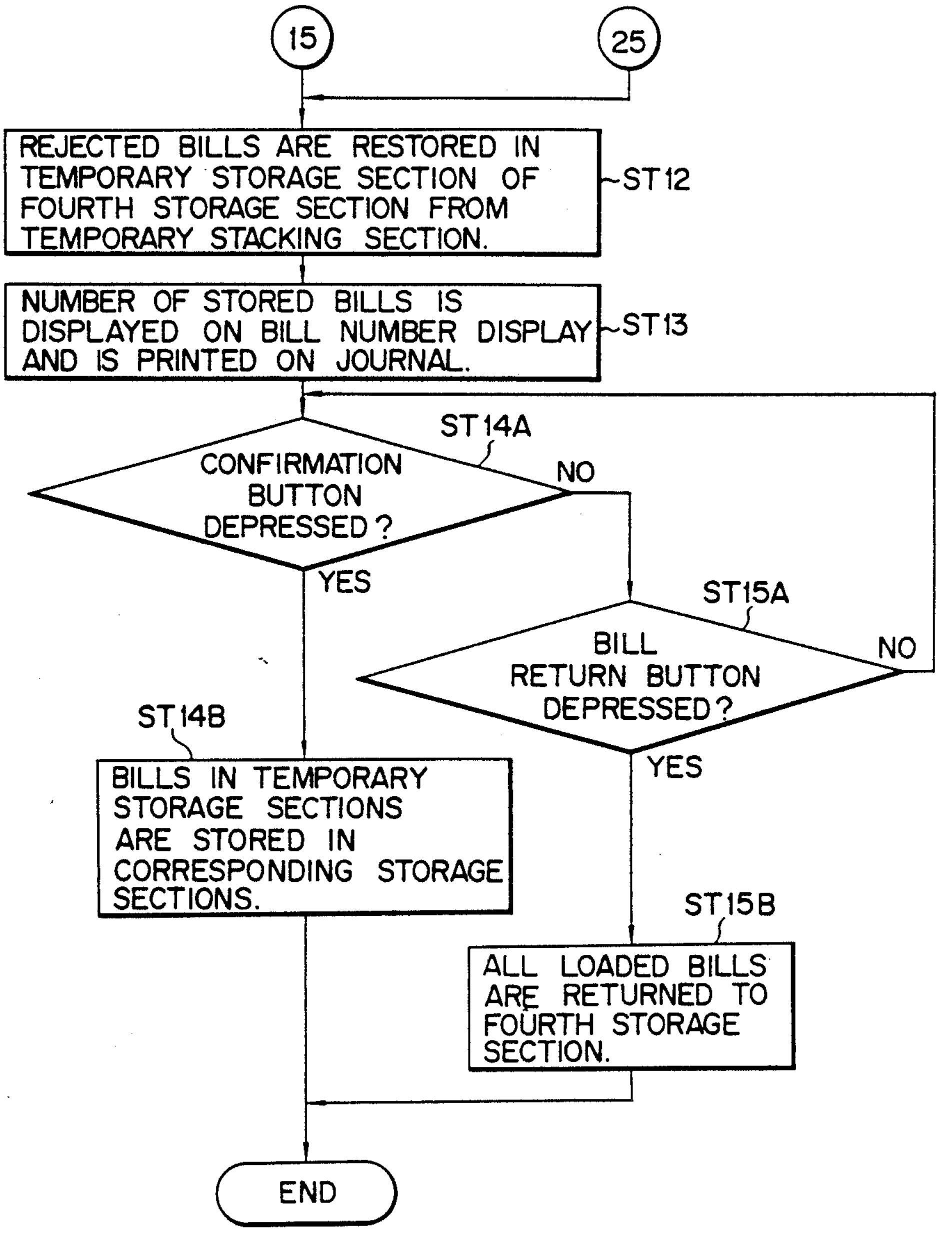
Figure 23D:
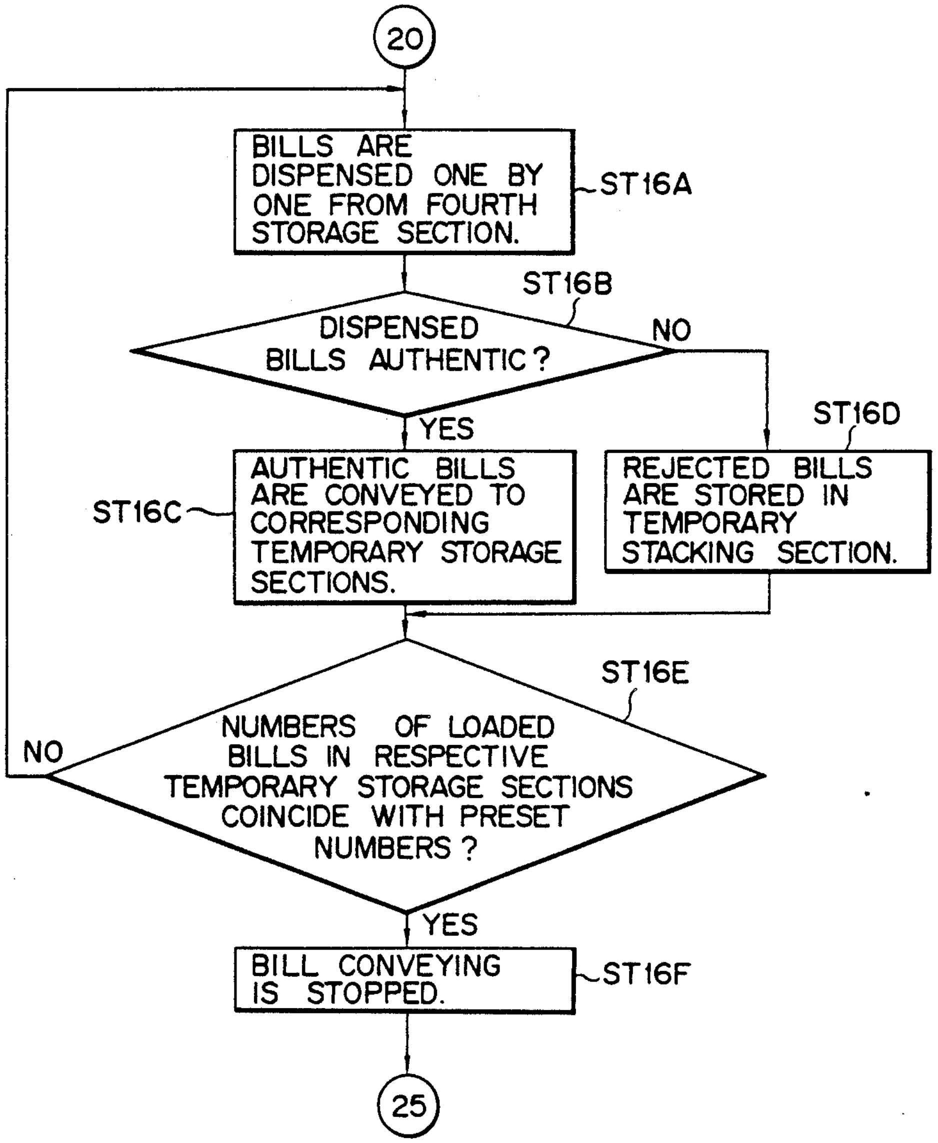

Replenishing of the bills will be described with reference to the flow charts of FIGS. 23A, 23C and 23D and the bill flow shown in FIG. 24.

When the second storage section 21 or the third storage section 22 becomes almost empty, ending of bills is indicated. The personnel depress the replenishing button 163 of the internal monitor unit 13 and enter the number of bills to be replenished of each of the predetermined denominations with the keyboard 173 (ST22). In this case, the main control section 150 stores the respective replenishing bill number data in a memory 152. The main control section 150 also causes the CRT display unit 10 to display a message "Replenishing. Please wait".

The main control section 150 checks in accordance with the detection signal from the sensor 41h whether or not the bills are preset in the fourth storage section 23 (ST5). If the main control section 150 detects that no bills are present, the main control section 150 causes the operating state code display 161 to display an error code and the recovery/loading indicator 174 to indicate that no bills are present (ST6). Upon display of the error code, the personnel enter a mixture of bills of the second and third denominations in the fourth storage section 23 of the fourth bill cassette 19 (ST7).

Thereafter, when the personnel depresses the replenishing button 163, step ST8 is determined to be YES, and the routine advances to the next step (ST16A). However, when the recovered bills are present, they must be removed and the bills to be replenished are stored.

When the bills are sufficiently present, the main control section 150 causes the bill receiving/dispensing mechanism 12 to dispense bills, one by one, from the storage section 23 in the same manner as the deposit transaction operation (ST16A). The bill is then conveyed along the fourteenth convey path R14 and the rear half portion of the first convey path R1 and passes through the discrimination section 36. The discrimination section 36 discriminates the bill (ST16B) and the discrimination result is supplied to the main control section 150. The main control section 150 causes the counter to count the number of bills of the second and third denominations by the discrimination results and checks whether the bills are "authentic". Therefore, the authentic bills passed through the discrimination section 36 are stacked in the corresponding temporary storage sections 34 and 33 (ST16C). In practice, the selector gate 39a is pivoted to the left, and the authentic bills passed through the discrimination section 36 are conveyed toward the corresponding storage sections 21 and 22 through the second convey path R2, as indicated by the thick solid line in FIG. 24. On the other hand, the rejected bills passed through the discrimination section 36 are conveyed in the temporary stacking section 38 through the third convey path R3 since the selector gate 39a is pivoted to the right (ST16D).

In this case, the main control section 150 checks whether or not the discriminated numbers of bills of the second and third denominations coincide with the preset numbers, respectively (ST16E). After the discriminated number of bills of the second or third denomination coincides with the preset number thereof and when a bill having the same denomination as in the coincided denomination passes through the discrimination section 36, this bill is regarded as a rejected bill and is stored in the temporary stacking section 38. On the other hand, when the discriminated numbers of bills of the second and third denominations coincide with the preset numbers, respectively, the last bill having the same denomination as the coincided denomination is conveyed and is stored in the corresponding temporary storage section 33 or 34. Thereafter, when the main control section 150 detects that no bills are left in any one of the convey paths R1 to R15 in response to the detection signals from the sensors 40a to 40u, all the convey members are stopped. In this case, the main control section 150 is operated to collectively transfer the rejected bills stacked in the temporary stacking section 38 to the bill storage chamber 51, as indicated by the thick alternate long and short dashed line in FIG. 24 (also see FIG. 7). The bills are fed, one by one, in the same manner as in the recovery operation and are stacked in the temporary storage section 35 of the fourth storage section 23. Upon detecting that no residual bills are present, the bills in the temporary storage section 35 are stored in the fourth storage section 23 (ST12).

Figure 27:
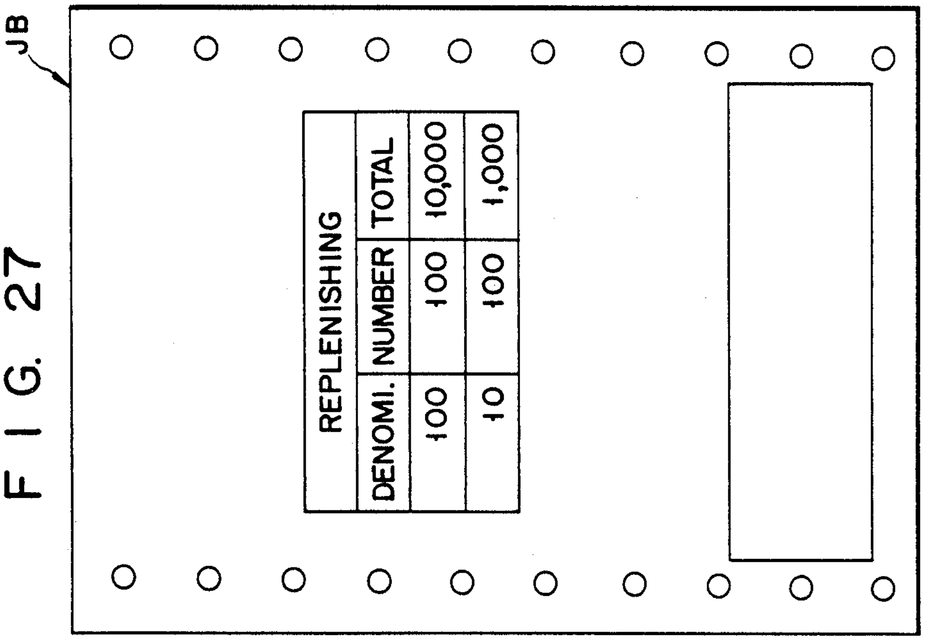
FIG. 27 is a plan view showing a printed journal when bills are replenished.

When the series of replenishing operations are completed, the main control section 150 causes the printer (not shown) of the card/receipt processing unit 11 to print the replenishment content (i.e., the numbers of bills of the third and second denominations) on a journal JB and to issue the printed journal JB as shown in FIG. 27. At the same time, the main control section 150 causes the bill number display 164 of the internal monitor unit 13 to display the numbers of bills of the third and second denominations (ST13). In addition, the main control section 150 causes the recovery/loading display 174 when any rejected bill is returned so as to signal the returning of the rejected bill to the bank personnel. The bank personnel can then remove the returned bills from the fourth storage section 23 by removing the fourth bill cassette 19 from the apparatus 1 and count the number of the returned bills.

The personnel check the numbers of bills of the respective denominations and the amounts in accordance with the count, the printed content of the journal JB, and the display content on the internal monitor unit 13 (ST13). Upon such confirmation, the personnel depress the storage button 166 of the internal monitor unit 13 (ST14A). The last bills stored in the temporary storage sections 33 and 34 are stored in the storage sections 21 and 22, respectively (ST14B), thereby completing the replenishing operation. At this time, the main control section 150 adds the numbers of bills stored in the storage sections 22 and 21 with replenished numbers, respectively.

When the personnel over/underload the bills during loading or when identification cannot be performed due to personnel's miscalculation, the personnel depress the bill return button 167 of the internal monitor unit 13 (ST15A). In this case, the all bills loaded in the second and third storage sections 21 and 22 and the temporary storage sections 34 and 33 are dispensed, one by one, in the same manner as the withdrawal transaction operation and are conveyed in the discrimination section 36 through the tenth convey path R10 or the eleventh convey path R11, the rear half portion of the second convey path R2, and the rear half portion of the first convey path R1 as shown by the solid line in FIG. 26. The selector gates 39*a*, 39*h* and 39*g* are pivoted to the right, left and left, respectively. Therefore, the bills passing through the discrimination section 36 are conveyed in the third convey path R3 in accordance with the right position of the selector gate 39*a*, and are conveyed in the fifteenth convey path R15 in accordance with the left position of the selector gate 39*h*.

Thereafter, the bills are conveyed from the fifteenth convey path R15 to the first convey path R1 and are conveyed in the thirteenth convey path R13 in accordance with the left position of the selector gate 39*g*. The recovered bills are then stored in the temporary storage section 35 of the fourth storage section 23 and then in the fourth storage section 23. This operation is repeated in the same manner as in replenishing every time 100 bills are stacked, so that the number of the replenished bills are returned from the third and second storage sections 22 and 21 and the corresponding temporary storage sections 34 and 33. The above operation is repeated until no more bills are conveyed along the convey path (ST15B), thus completing replenishing operation. The flow of bills in the return operation as a result of replenishing is illustrated in FIG. 26.

As described above, when the bills stored in the third or second storage section 22 or 21 is almost running out (ending), the personnel can replenish a desired number of bills. Therefore, toward the end of the banking hours, the personnel can replenish the bills which they consider will be required for the rest of that day, thereby preventing waste of time which is caused by loading.

In the above embodiment, the bills to be loaded and replenished are used as bills of the second and third denominations which are used for the withdrawal transactions. However, loading and replenishment can be made for the bills of the second or third denominations.

As is apparent from the above description, loading and replenishment are performed in units of 100 bills. Even if the bills are jammed in the dispensing section, the convey section and the stacking or storage section during operation, the number of bills stored before jamming occurs has been counted. Therefore, the bills entered in the third and second storage sections 22 and 21 are left therein, and only the bills stored in the temporary storage sections 34 and 33 and subjected to convey and dispense. After the apparatus 1 is reset, it can continue to operate upon depression of the loading button 160 or the replenishing button 163. In this manner, recovery operation by the bank personnel can be simply performed when a problem occurs.

In loading and replenishment, the surfaces of the bills are aligned and the fit bills are set in the apparatus 1 according to the common practice in banking procedures. However, even if the obverse/reverse-presented bills and fit/unfit bills are mixed, discrimination procedures such as "denomination discrimination", "obverse/reverse-presented discrimination", "fit/unfit discrimination" and "true (authentic)/false (counterfeit) discrimination" are performed in the same manner as in the deposit transaction operation.

When replenishment is performed by using the fourth bill cassette 19, depression of the replenishing button 163 becomes effected when the customer is waiting. While the customer operates at the operation panel, the replenishing button cannot be effected even if it is depressed. The start of replenishment is displayed at the CRT display unit 10, and the end thereof restores automatic transaction operation. However, while the bills are replenished, transactions excluding a deposit can be performed. Even a deposit/withdrawal transaction can be performed up to the step wherein a card/passbook is inserted in the apparatus 1. In addition, when loading is limited to the early morning procedure, the number of bills is large, and it takes a long period of time to load the bills. Therefore, loading is preferably performed while the ATM is stopped, so as to provide better service to the customers.

The flow of bills in replenishment operation at the operation panel 3 will be described with reference to FIG. 19. The bank personnel ckeck that the apparatus 1 is set in the standby mode and insert and turn a key in a personnel key switch arranged in the operation section. Upon turning of the key, the personnel key switch is turned on. The main control section 150 is then set in the personnel mode and causes the CRT display unit 10 to display a message "Specify operation". In response to this message, the personnel select bill replenishment with the operation buttons 8.

The main control section 150 is then set in the mode wherein the apparatus 1 can accept bills for replenishment. The main control section 150 supplies a replenishment command to the bill receiving/dispensing mechanism 12 and causes the CRT display 10 to display a message "Insert bills to be replenished from bill receiving/dispensing port." The bill receiving/dispensing mechanism 12 opens the door 50 of the bill receiving/dispensing port 7. The personnel then vertically insert the bills A in the bill storage chamber 51 and close the door 50. Thereafter, in the same manner as in the deposit transaction operation, the bills are conveyed, one by one, from the bill storage chamber 51 and are stacked in the temporary storage sections 33 and 34 through the discrimination section 36.

When this stacking operation is completed, the main control section 150 causes the CRT display unit 10 to display the number of bills stacked in each of the temporary storage sections 33 and 34. The main control section 150 also causes the CRT display unit 10 to indicate the "storage" and "return" buttons so that the personnel can select one of them. At the same time, the main control section 150 causes the printer to print the replenishment contents (i.e., the numbers of replenished bills of the second and third denominations, respectively, as shown in FIG. 27) on the journal JB and to dispense the printed journal JB in the same manner as the replenishment operation using the fourth storage section 23. The personnel can identify the printed content on the journal with the displayed content.

When identification is established, the personnel depress one of the operation buttons 8 which serves as the "storage" button. The bills in the temporary storage sections 33 and 34 are stored in the bill storage sections 21 and 22, respectively. In this case, only replenishment (reception of bills) in the personnel mode is performed, and the on-line communication between the main control section 150 and the host computer is prohibited. As a result, the main control section 150 updates the total number of bills by adding the number of replenished bills. However, when the button of the operation buttons 8 which serves as the "return" button is depressed, the bills are dispensed at the bill receiving/dispensing port 7 in the same manner as in the deposit return operation.

Figure 28A:
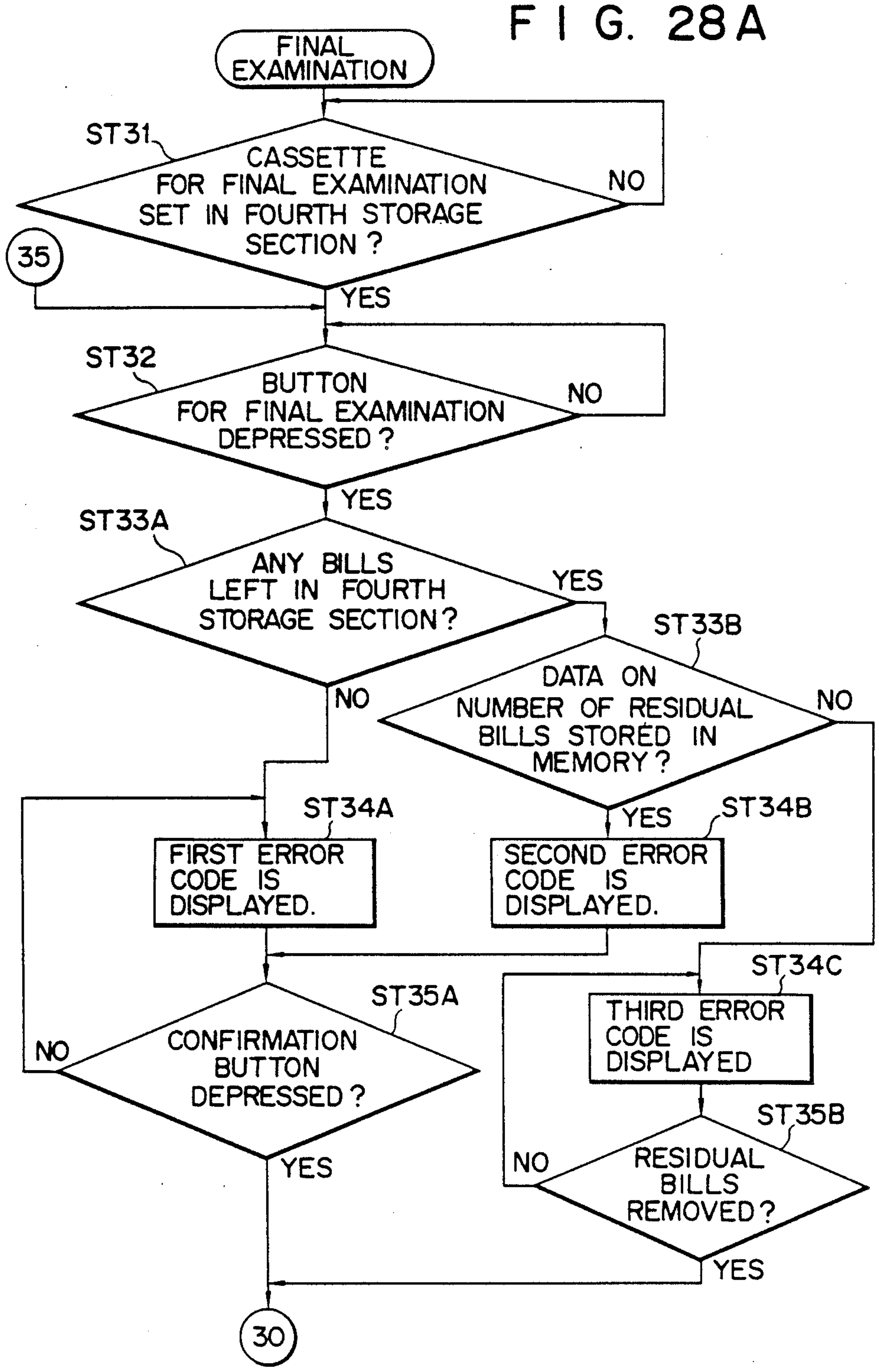
FIGS. 28A and 28B flow charts for explaining the final examination operation.
Figure 28B:
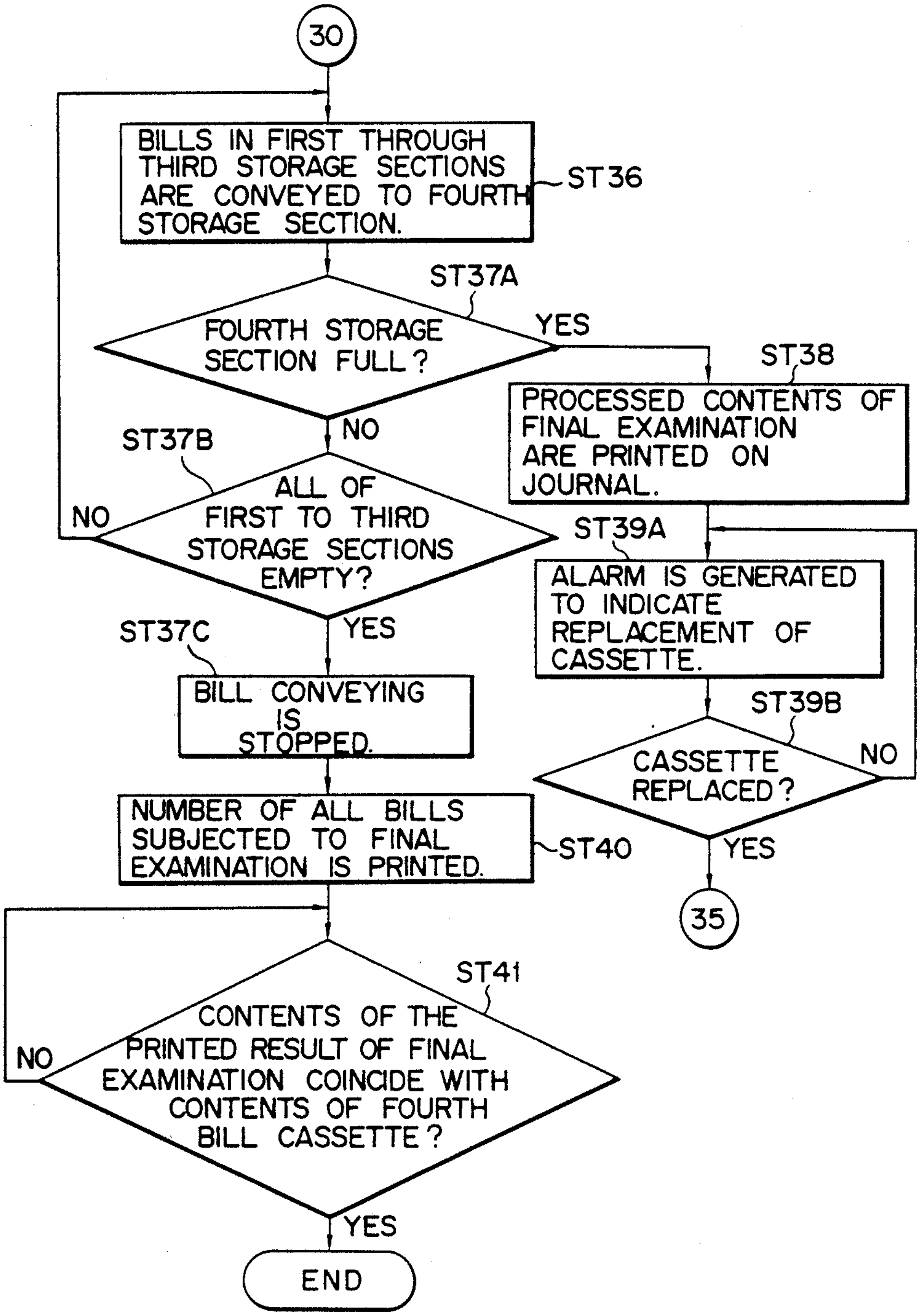

Final examination operation for daily transactions will be described with reference to the flow charts of FIGS. 28A and 28B and the bill flow shown in FIG. 29.

After banking hours in the evening or before banking hours next morning, the bank personnel set a summary bill cassette in the fourth storage section 23 (ST31). The personnel depress the final examination button 168 of the internal monitor unit 13 (ST32). Upon depression of the final examination button 168, the main control section 150 is set in the final examination mode and supplies a final examination command to the bill receiving/dispensing mechanism 12. In this case, the main control section 150 checks in accordance with the detection signal from the sensor 41*h* whether or not the bills are left in the fourth storage section 23 (ST33A). If it is determined that no bill is left in the storage section 23, the main control section 150 causes the operating state code display 161 of the internal monitor unit 13 to display a first error code, and to generate an alarm (ST34A). Upon hearing this alarm, the personnel depress the confirmation button 166 (ST35A).

However, when the main control section 150 detects that the bills are left in the fourth storage section 23, the main control section 150 determines whether or not the number of residual bills is stored (ST33B). As a result, if YES in step ST33B, the main control section 150 causes the operating state code display 161 of the internal monitor unit 13 to display a second error code, and to generate an alarm (ST34B). Upon this alarm, the personnel depress the confirmation button 166 (ST35A).

However, when the main control section 150 determines that no residual bill number data are stored, the main control section 150 causes the operating state code display 161 of the internal monitor unit 13 to display a third error code, and to generate an alarm (ST34C). Upon hearing this alarm, the personnel remove the bill cassette for final examination from the fourth storage section 23 and remove the residual bills. The personnel then insert the empty bill cassette for final examination in the fourth storage section 23 (ST35B).

When the confirmation button 166 is depressed or the bill cassette for final examination is reset, the main control section 150 causes the bill receiving/dispensing mechanism 12 to dispense the bills from the storage sections 20, 21 and 22 in the same manner as in the withdrawal transaction operation, and the dispensed bills are stacked in the temporary storage section 35. That is to say, the flappers 132 and 133 of the separator mechanism 30 of the third storage section 22 are opened by the pulse motor 136. The pulse motor 110 is then started to pivot the movable member 108 clockwise. In this manner, a space of 0.5 to 1.5 mm is formed between the bill A and each of the rotating members 106, as shown in FIG. 14. The vacuum pump is started to dispense the bill A from the third storage section 22, so that the vacuum pressure inside the hollow shaft 107 is increased. The endless belts 119 which constitute the eleventh convey path R11 are started to travel and the rotating members 106 as the dispensing mechanism are started to rorate. Thus, bill dispensing is started.

Figure 29:
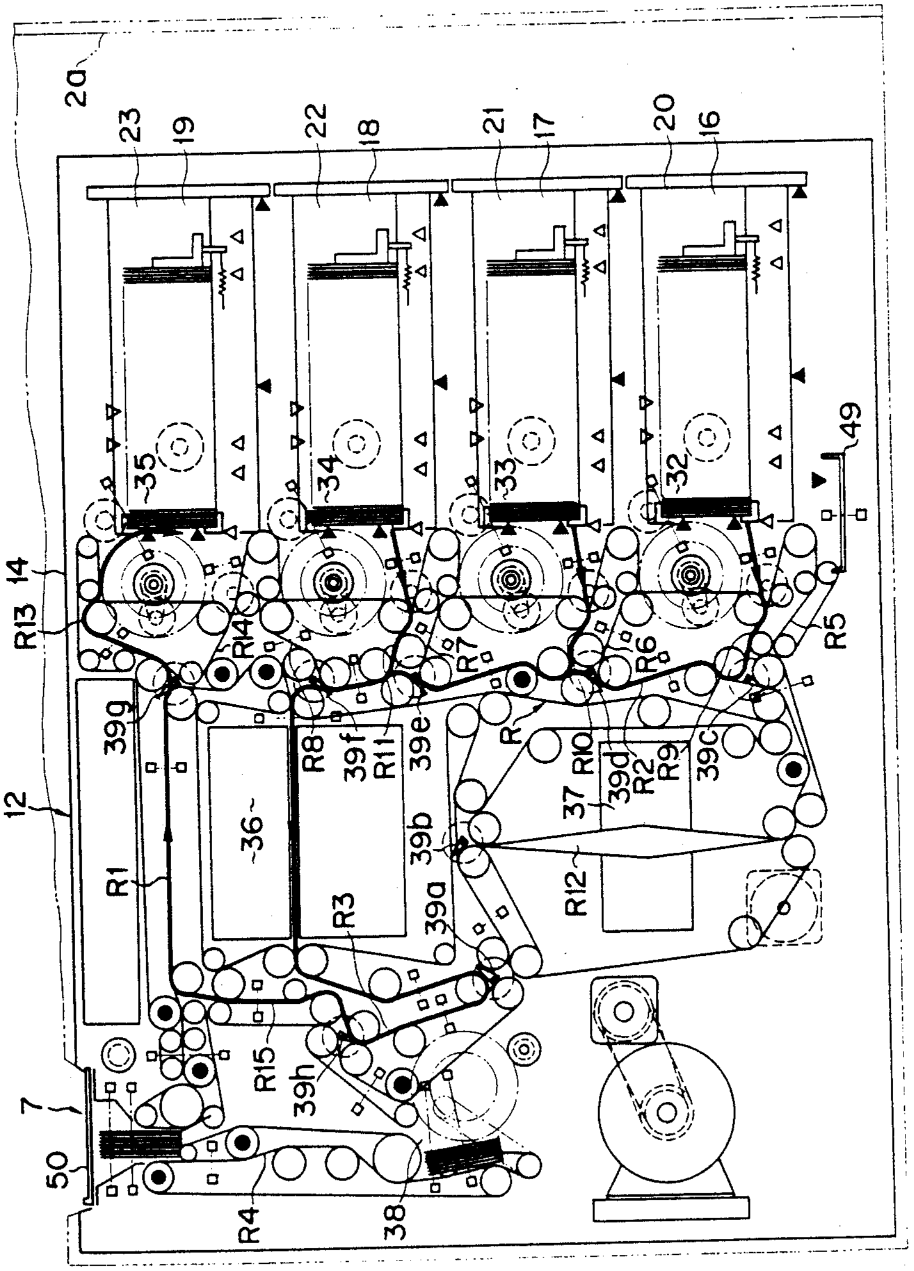
FIG. 29 is a side view showing a bill flow at the time of final examination.

The bill thus dispensed is guided by the selector gates 39*f*, 39*a*, 39*h* and 39*g* and is conveyed along the rear half portion of the second convey path R2, the rear half portion of the first convey path R1, the third and fifteenth convey paths R3 and R15, the front half portion of the first convey path R1 and the thirteenth convey path R13 as shown by the thick solid line in FIG. 29. The bill is then stacked in the temporary storage section 35.

In this case, the bills dispensed from the third storage section 22 are detected by the bill flow sensor 40*r*, and the main control section 150 counts the number of bills in response to the detection signal from the sensor 40*r*. The bills dispensed from the third storage section 22 is also subjected to "denomination discrimination" when they pass through the discrimination section 36. The discrimination result is supplied to the main control section 150 which then causes the counter (not shown) to count the discrimination result. The bills stacked in the temporary storage section 34 are detected by the bill flow sensor 40*l*, and the main control section counts the number of stacked bills in response to the signal from the sensor 40*l*.

When the count of the sensor 40*l* becomes 100, the main control section 150 causes the bill receiving/dispensing unit 15 to temporarily stop dispensing the bills from the third storage section 22, so that the 100 bills are collectively supplied from the temporary storage section 35 to the fourth storage section 23. When this storage operation is completed, the bills are subsequently dispensed from the third storage section 22. When the number of bills stored in the temporary storage section 35 becomes 100, the 100 bills are stored in the fourth storage section 23. This operation continues until the bills of the third denomination becomes zero. In other words, the above operation continues until the empty state of the third storage section 22 is detected by the empty-state sensor 42 and the sensor 41*g* generates the "bright" signal. When the number of last bills stacked in the temporary storage section 35 does not reach 100, the bills are stored in the fourth storage section 23 from the temporary storage section 35 when the last bill is stacked in the temporary storage section 35. The bills in the second and first storage sections 21 and 22 are conveyed and stored in the same manner as in the bills conveyed and stored from the third storage section 22 to the fourth storage section 23 (ST36).

When the fourth storage section 23 is filled with the bills during final examination (ST37A), the main control section 150 causes the printer (not shown) of the card-/receipt processing unit 11 to print the final examination process and issue a journal JC (ST38). At the same time, the main control section 150 causes the operating state code display 161 of the internal monitor unit 13 to display a code representing a replacement of the cassette for final examination and the display 177 of the remote monitor 175 to display the same code (ST39A). The apparatus 1 waits for replacement of the cassette (ST39B).

Figure 30:
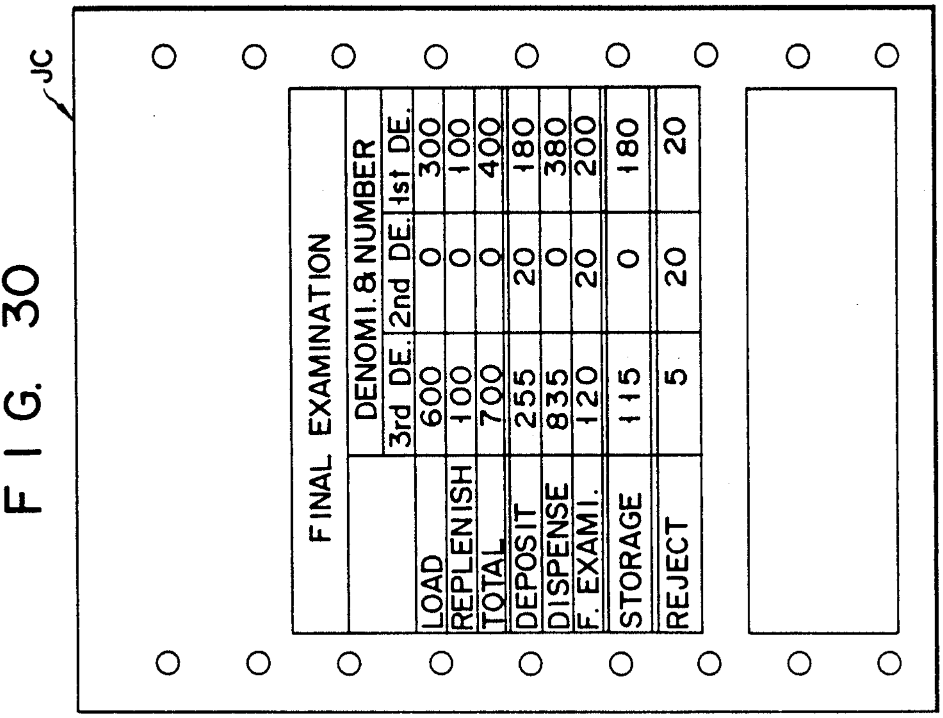
FIG. 30 is a plan view showing a printed journal at the time of final examination.

The processed contents of final examination which are printed on the journal JC are the numbers and amounts of bills of the first through third denominations, respectively (ST38), as shown in FIG. 30. When the personnel receive this journal JC, they replace the filled cassette with an empty one with respect to the fourth storage section 23 (ST39B). When the personnel depress the final examination button 166 again (ST32), final examination is restarted.

Final examination continues until the absence of any bill in each of the storage sections 22, 21 and 20 is detected by the empty-state sensor 42 and the sensors 41*g*, 41*f* and 41*e* generate the "bright" signals (ST37B). When the last bill is conveyed and stacked in the temporary storage section 35, the main control section 150 detects that no bill remains in the convey paths R1 to R15 by means of the sensors 40*a* to 40*u*, and the convey members are then stopped (ST37C). In this case, the main control section 150 causes the bill number display 164 of the internal monitor unit 13 to display the numbers of bills of the first to third denominations, respectively, which are stored in the fourth storage section 23. At the same time, the main control section 150 causes the printer (not shown) of the card/receipt processing unit 11 to print the number of all bills subjected to final examination on the journal (i.e., to print the number of bills in units of denominations) (ST40). The personnel pull out the fourth bill cassette 19 and identify the contents of the journal with the contents in the cassette 19 (ST41).

The rejected bills detected during final examination are temporarily stacked by the selector gates 39*a* and 39*h* in the temporary stacking section 38. These rejected bills are stored from the fourth temporary storage section 35 in the fourth storage section 23. These bills are then collectively returned to the bill storage chamber 51 and are conveyed, one by one, in the empty temporary storage section 35. In this case, the bills which are not subjected to final examination have been already stored in the fourth storage section 23 and are separated by the separator mechanism 31 from the rejected bills which cannot be subjected to final examination and be distinguished therefrom.

When the number of rejected bills at dispensing, that is, bills stored in the rejected bill stacking section 49 is zero in the bill dispension (withdrawal) mode, the main control section 150 subtracts the numbers of dispensed bills from the number of bills loaded and replenished to the storage sections 20, 21 and 22 and adds the number of received bills to the difference. The number of bills subjected to final examination is subtracted from the sum, and the difference obtained is regarded as the number of rejected bills. On the other hand, when the number of bills stacked in the rejected bill stacking section 49 is a number except for "0", the rejected bill number is calculated as a sum of the number of bills stored in the rejected bill stacking section 49 and the number of rejected bills stored in the temporary stacking section 38. As a result of final examination, the contents such as the loaded bill number data of the respective denominations, the replenished bill number data, the total loaded/replenished bill number data, the deposited bill number data, the dispensed bill number data, the final examination bill number data, the number of bills in the storage section 23, and the number of bills in the temporary storage section 35 are printed on the journal JC, as shown in FIG. 30.

When a problem such as jamming occurs during final examination, the bill receiving/dispensing unit 15 is immediately stopped. On the other hand, the contents of the bills stored in the fourth storage section 23 in units of 100 bills are printed on the journal JC. Therefore, the bills which have already been stored in the fourth storage section 23 need not be subjected to final examination again, and only the bills conveyed toward the temporary storage section 35 and conveyed for dispensing need be subjected to final examination again.

Figure 31A:
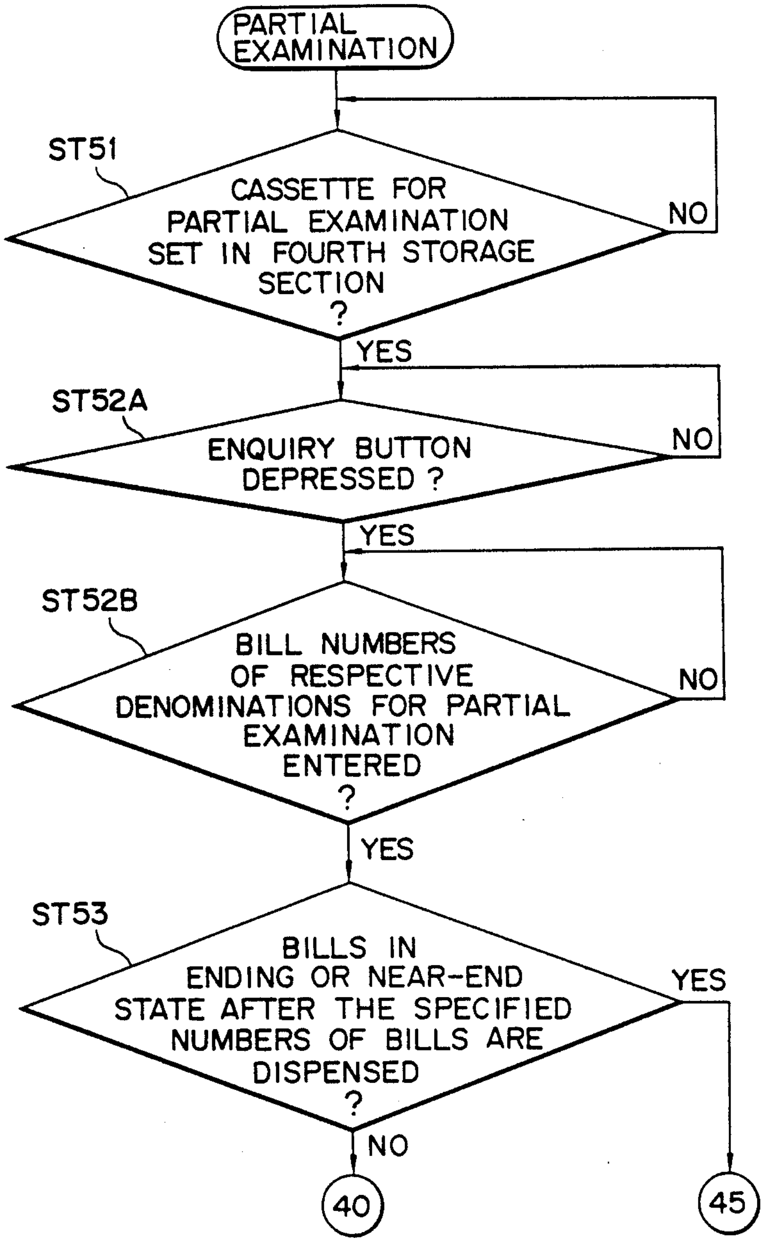
FIGS. 31A to 31C flow charts for explaining partial examination.
Figure 31B:
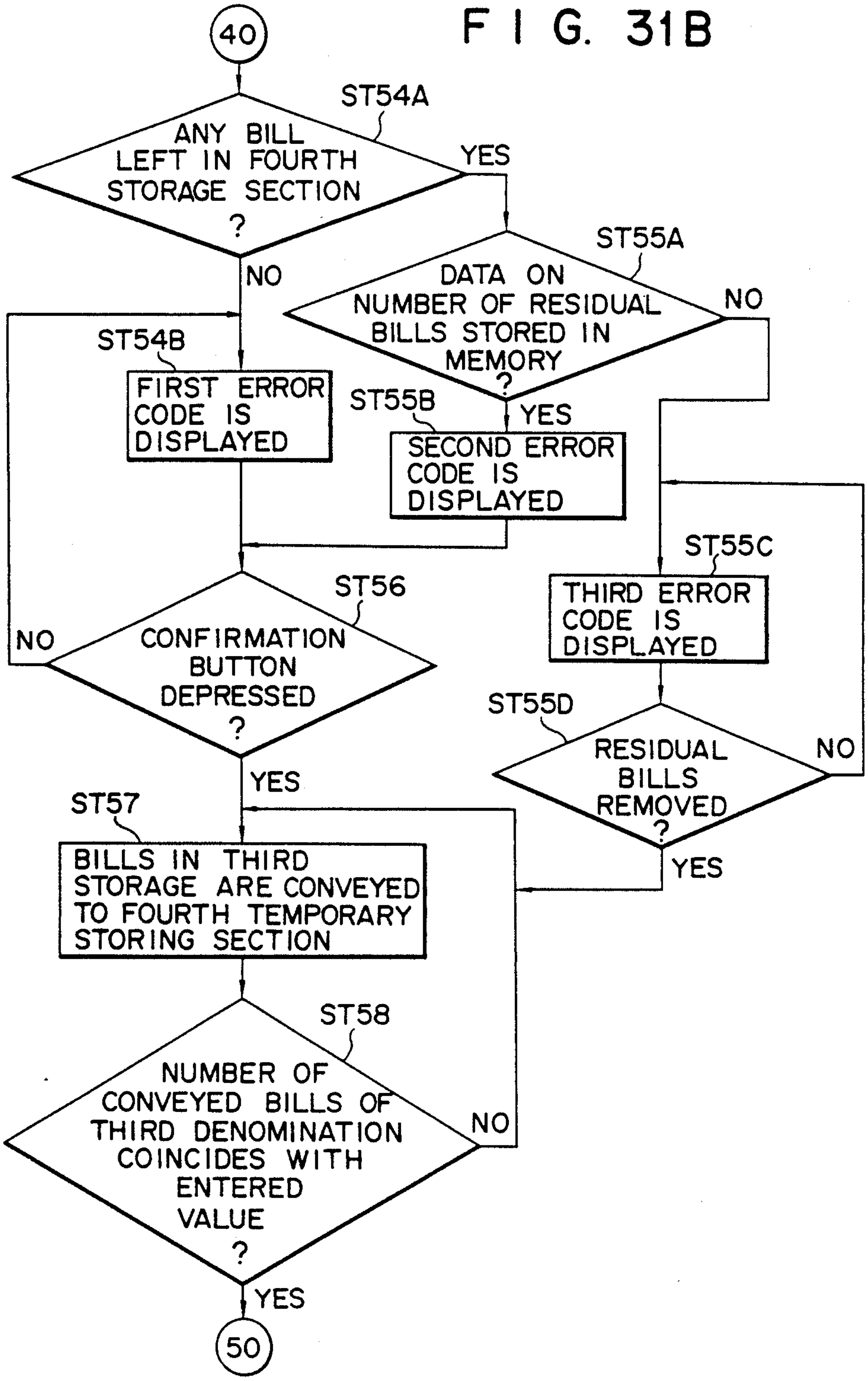
Figure 31C:
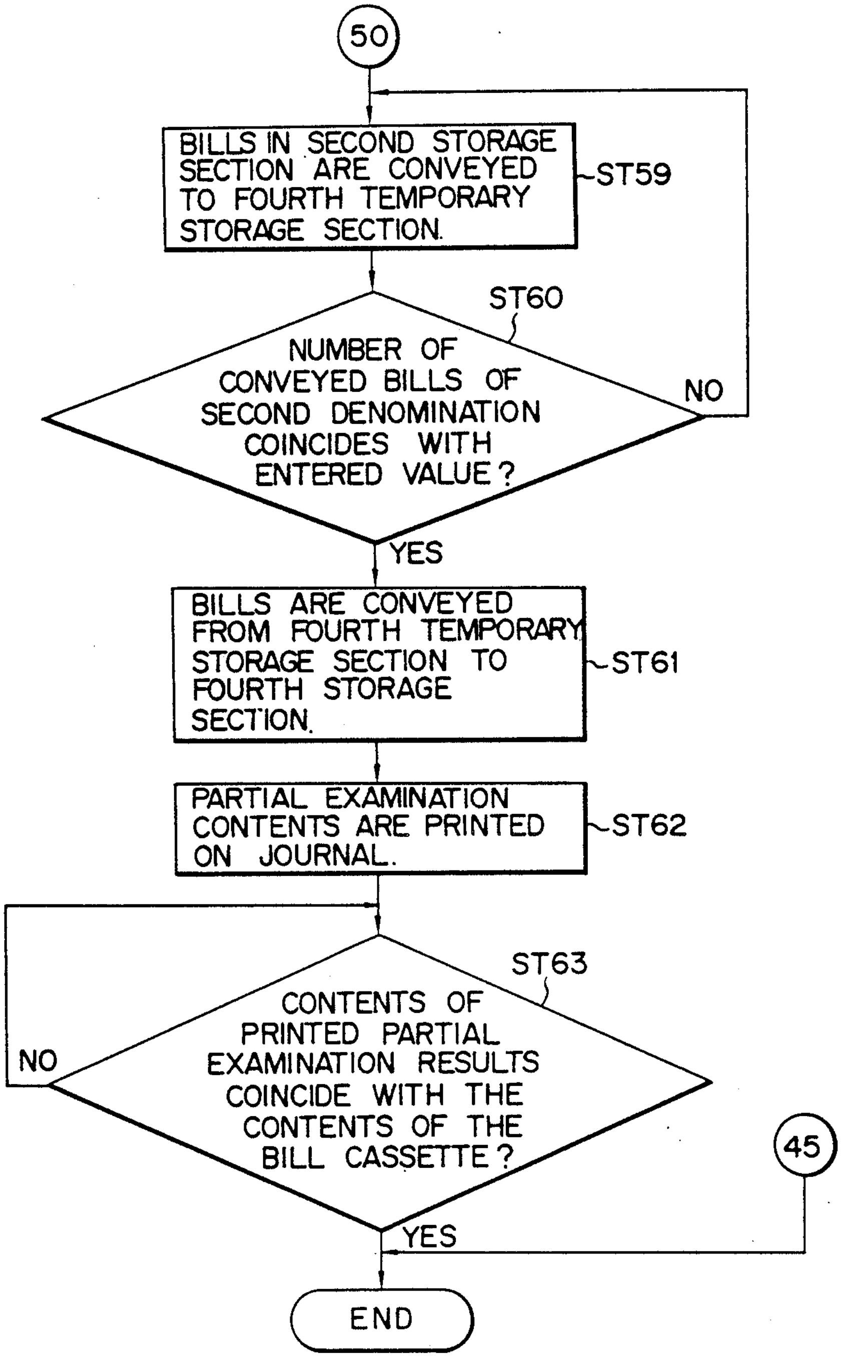

Partial examination in the utilization of the bills for deposit/withdrawal in service will be described with reference to flow charts of FIGS. 31A to 31C and the bill flow shown in FIG. 29.

When the personnel wish to remove a predetermined number of bills from the second and third storage sections 21 and 22, they set a partial examination bill cassette in the fourth storage section 23 (ST51). The personnel depress the enquiry button 169 of the internal monitor unit 13 (ST52A) and enter the partial examination bill numbers of the respective denominations at the keyboard (ST52B). In this case, the main control section 150 stores the partial examination bill number data of the respective denominations in the memory 152. The main control section 150 also checks that the operating mode is neither set in the standby mode nor in the deposit/withdrawal mode. At the same time, the main control section 150 checks that the bills of the third and second denominations are not in the ending or end state in accordance with the number data stored in the memory 152 even :f partial examination operation for a predetermined number of bills is performed (ST53). When the above conditions are not satisfied, the main control section 150 interrupts the partial examination operation. Otherwise, the main control section 150 causes the CRT display unit 10 to display a message "Partial examination. Please wait."

The main control section 150 checks in accordance with a signal from the residual bill sensor 41*a* whether or not any bill is stored in the storage section 23 (ST54A). If NO in step ST54A, the main control section 150 causes the operating state code display 161 to display the first error code (ST54B), and to generate an alarm. Upon hearing the alarm, the personnel depress the confirmation button 166 (ST56).

On the other hand, if YES in step ST54A, the main control section 150 determines whether or not the residual number data are stored in the memory 152 (ST55A). As a result, if YES in step ST55A, the main control section 150 causes the operating state code display 161 of the internal monitor unit 13 to display a second error code, and to generate an alarm (ST55B). Upon generation of this alarm, the personnel depress the confirmation button 166 (ST56).

However, when the main control section 150 detects that the residual bill number data are not stored, the main control section 150 causes the operating state code display 161 of the internal monitor unit 13 to display the third error code, and to generate an alarm (ST55C). Upon generation of this alarm, the personnel remove the bill cassette for partial examination from the fourth storage section 23 and the bills from the cassette. Thereafter, the bill cassette for partial examination is set again in the fourth storage section 23 (ST55D).

Upon depression of the confirmation button 166 or resetting of the bill cassette for partial examination (ST56), the main control section 150 causes the bill receiving/dispensing mechanism 12 to dispense the bills of the third denomination from the third storage section 22 and to stack them in the temporary storage section 35 in the same manner as in the withdrawal transaction operation (ST57).

More specifically, the flappers 132 and 133 of the separator mechanism 30 of the third storage section 22 are opened by the pulse motor 136. The pulse motor 136 is started to rotate the movable member 108 clockwise. A space of 0.5 to 1.5 mm is formed between the bill A and each of the rotating members 106 (FIG. 14). A vacuum pump is started to dispense the bill of the third denomination from the third storage section 22, and the vacuum pressure inside the hollow shaft 107 is increased. The convey belts 119 which constitute the eleventh convey path R11 are started to travel and the rotating members 106 as the dispensing mechanism are started to rotate, thereby initiating dispensing. The bill of the third denomination is then guided by the selector gates 39f, 39a, 39h and 39g and is conveyed along the rear half portion of the second convey path R2, the rear half portion of the first convey path R1, the third convey path R3, the fifteenth convey path R15, the front half portion of the first convey path R1, and the thirteenth convey path R13. The bill is stacked in the temporary storage section 35.

In this case, the bills dispensed from the third storage section 22 are detected by the bill flow sensor 40r, and the detected signal is supplied to the main control section 150 which counts the number of bills. When the dispensed bills are passed through the discrimination section 36, they are subjected to denomination discrimination and the discrimination result is supplied to the main control unit 150. The main control unit 150 causes the counter (not shown) to count the discrimination result. In addition, the bills stacked in the temporary storage section 35 are detected by the bill flow sensor 40l, and the detection signals therefrom are supplied to the main control section 150 which counts the number of stacked bills.

Figure 32:
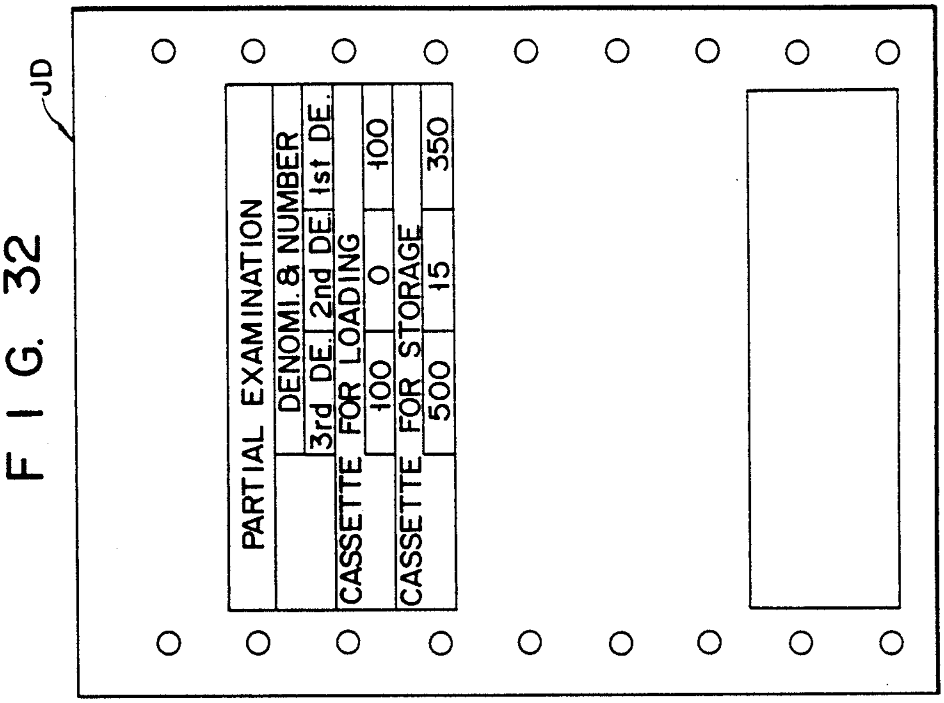
FIG. 32 is a plan view showing a printed journal at the time of partial examination.

When the count (number of bills of the third denomination) of the bill flow sensor 40l reaches a predetermined value (ST58), the main control section 150 causes the bill receiving/dispensing unit 15 to stop dispensing the bills from the third storage section 22. Subsequently, the bills of the second denomination are dispensed from the second storage section 21 (ST59). When the main control section 150 detects that the number of bills of the second denomination conveyed in the temporary storage section 35 reaches a predetermined value (ST60), the main control section 150 causes the bill receiving/dispensing mechanism 12 to stop dispensing the bills from the second storage section 21. The bills are then conveyed from the fourth temporary storage section 35 into the fourth storage section 23 (ST61). In this case, the main control section 150 causes the bill number display 164 of the internal monitor unit 13 to display the numbers of bills of the third and second denominations which are stored in the fourth storage section 23. At the same time, the main control section 150 causes the printer (not shown) of the card/receipt processing unit 11 to print the partial examination contents (the partial examination bill numbers of the third and second denominations) on a journal JD, as shown in FIG. 32 (ST62). The personnel identify the contents of the journal with the contents of the bill cassette 19 (ST63).

When the main control section 150 determines that the apparatus 1 is set in the standby mode or the bill receiving/dispensing mechanism 12 is operated, or that the bills of the third or second denomination are in the ending or end state if partial examination is performed, the accumulation data is printed as the enquiry data even if the enquiry button 169 is depressed. Furthermore, the main control section 150 causes the printer to print on the journal data representing incapability of partial examination.

Partial examination can be performed when a given cassette is filled with the bills in the same manner as described above. When the bills are removed to the fourth storage section 23 from the cassette which is filled with the bills, the full-state can be automatically released, so that the apparatus 1 can continuously receive the subsequent deposits.

Partial examination at the operation panel 3 will be described with reference to the bill flow shown in FIG. 21.

After the personnel check that the apparatus 1 is set in the standby mode, they insert and turn a key in a personnel key switch to turn on the key switch. The main control section 150 causes the bill receiving/dispensing mechanism 12 to set in the personnel mode and the CRT display unit 10 to display a message "Specify operation." In response to this message, the personnel depress a button of the operation buttons 8 which serves as a partial examination button. The main control section 150 then causes the CRT display unit 10 to display a message "Enter denomination and number of bills to be subjected to partial examination." In addition, the main control section 150 causes the CRT display unit 10 to display the numbers of bills of the second and third denominations. Therefore, the personnel can determine whether the partial examination of the specified denomination can be performed.

If they judge that the partial examination can be performed, they specify the necessary number of bills with the operation buttons 8. The main control section 150 causes the CRT display unit 10 to display the specified denomination and the number of bills, and a message "Check displayed contents and press confirmation or cancel button." In response to this message, the personnel depress the confirmation button, and the main control section 150 supplies a dispensing command to the bill receiving/dispensing mechanism 12. The mechanism 12 then performs dispensing of the bills as previously described, so that the predetermined numbers of bills of the second and third denominations are dispensed from the second and third storage sections 22 and 23. These bills are discriminated by the discrimination section 36 and are temporarily stacked in the temporary stacking section 38. Thereafter, these bills are collectively conveyed in the bill storage chamber 51. Subsequently, the door 50 of the bill receiving/dispensing port 7 is opened, and the bills are lifted by the dispensing mechanism as previously described. As a result, the personnel can take out the bills.

In this case, since bill dispensing is performed in the personnel mode, the on-line communication between the main control section 150 and the host computer is prohibited. The main control section 150 updates the number of dispensed bills and causes the printer (not shown) of the card/receipt processing unit 11 to print the dispensing contents on the journal in the personnel mode.

Thus dispensed bills can be inserted in any other ATM having small bill storage, so that bill replenishment at the receiving/dispensing port is performed, as previously described. Therefore, the capital for withdrawal/deposit can be effectively used among a plurality of ATMs.

In the above embodiment, the personnel mode is set by using the personnel reset key switch arranged on the customer operation panel. The personnel enter the number of bills to be subjected to examination. However, the examination operation is not limited to this mode of operation. For example, the personnel mode code, denomination data and bill number data may be recorded on the magnetic stripe of the card or passbook. Furthermore, the number of bills to be dispensed is entered with the operation buttons. However, the number of bill to be dispensed may be fixed to be 100. In the above embodiment, even if the number of bills is not specified, partial examination is performed in units of 100 bills.

What is claimed is:

1. An automatic bank note transaction apparatus comprising:

first means for storing bank notes initially loaded into the apparatus;

second means for storing bank notes to be used during subsequent transactions;

means for conveying the bank notes during an initial loading operation from said first storing means to said second storing means, said conveying means having a path for connecting said first storing means to said second storing means and conveying the bank notes;

said second storing means including a temporary storage section connected to a trailing end of said conveying path and a storage portion connected to the temporary storage section;

means, provided in said conveying path, for discriminating during said initial loading operation the bank notes passing therethrough and generating a discrimination result;

means for counting during said initial loading operation the number of bank notes passing through said discrimination means in accordance with the discrimination result and generating a count result;

replenishment means for specifying the number of bank notes to be replenished;

wherein said conveying means stops conveying the bank notes from said first storing means to said second storing means when the count result generated by said counting means coincides with the number of bank notes specified by said replenishment means;

output means for generating a loading content in accordance with the count result; and means for confirming an end of replenishment in accordance with an output from said output means;

wherein the bank notes are conveyed from said temporary storage section to said storage portion of said second storing means in accordance with a confirmation input to said confirming means.

2. The apparatus according to claim 1, wherein said output means comprises display means for displaying the loading content.

3. The apparatus according to claim 1, wherein said output means comprises printing means for printing the loading content on a sheet.

4. The apparatus according to claim 1, wherein said second storing means comprises a plurality of storage sections provided to correspond to different denominations, said discriminating means generates a discrimination signal by discriminating a denomination of the bank notes passing therethrough, and said conveying means conveys the bank notes to corresponding storage sections of said second storing means in accordance with the discrimination signals.

5. The apparatus according to claim 1, which further comprises:

specifying means for specifying a loading operation;

detecting means for detecting a presence of a bank note in said second storing means; and alarm means for signalling the presence of the bank note in the second storing means when the loading operation is specified by said specifying means and the presence of the bank note is detected by said detecting means.

6. The apparatus according to claim 5, wherein said conveying means conveys the bank note from said first storing means to said second storing means upon removal of the bank note from said second storing means after the presence of the bank note is signalled by said alarm means.

7. The apparatus according to claim 5, wherein said conveying means conveys the bank note from said first storing means to said second storing means upon specification again by said specifying means after the presence of the bank note is signalled by said alarm means.

8. The apparatus according to claim 1, which further comprises:

return specifying means for specifying a returning operation of the bank notes loaded in said second storing means; and returning means for conveying the bank notes from said second storing means to said first storing means when the returning operation is specified by said return specifying means.

9. The apparatus according to claim 1, wherein said discriminating means performs a discrimination of fit/unfit bank note for reuse with respect to the bank notes passing therethrough, and said conveying means conveys to said second storing means the fit bank notes for reuse discriminated by said discriminating means.

10. The apparatus according to claim 9, which further comprises returning means for returning to said first storing means the unfit bank notes discriminated by said discriminating means.

11. The apparatus according to claim 10, wherein said returning means comprises: a return path for connecting said second storing means to said first storing means and conveying the bank notes; and temporary stacking means, disposed midway along said return path, for temporarily stacking the bank notes therein.

12. The apparatus according to claim 11, wherein said returning means conveys the unfit bank notes for return from said temporary stacking means to said first storing means after all the bank notes are loaded from said first storing means to said second storing means.

13. The apparatus according to claim 1, which further comprises a first bank note cassette which is detachably mounted in said first storing means to store the loading bank notes therein.

14. The apparatus according to claim 1, which further comprises:

specifying means for specifying a loading operation of the bank notes;

intermittent driving means for interrupting a convey operation which moves the bank notes from said temporary stacking section to said storage portion when the count result by said counting means coincides with a predetermined value; and detecting means for detecting a convey problem along said conveying means, wherein said conveying means interrupts the convey operation and holds the bank notes in said storing portion when the convey problem is detected by said detecting means and restarts the convey operation in response to another load operation specification from said specifying means when the convey problem is resolved.

15. The apparatus according to claim 1, wherein said replenishment specifying means permits a specification of the number of bank notes to be replenished during all transactions except for a deposit-withdrawal transaction.

16. The apparatus according to claim 1, wherein said second storing means further includes partitioning means adapted to be arranged between said temporary storage section and said storage portion, such that the bank notes stored in said temporary storage section and said storage portion are sorted when said partitioning means is positioned therebetween, and the bank notes stored in said temporary storage section and said storage portion are merged when said partitioning means is removed therefrom.

17. The apparatus according to claim 1, wherein said output means comprises display means for displaying a replenishment content.

* * * * *